(12) United States Patent
Kim

(10) Patent No.: US 12,141,192 B2
(45) Date of Patent: Nov. 12, 2024

(54) METHOD AND APPARATUS FOR INPUTTING FOOD INFORMATION

(71) Applicant: Nuvilabs Co., LTD., Incheon (KR)

(72) Inventor: Dae Hoon Kim, Seoul (KR)

(73) Assignee: NUVILABS CO., LTD., Incheon (KR)

( * ) Notice: Subject to any disclaimer, the term of this patent is extended or adjusted under 35 U.S.C. 154(b) by 509 days.

(21) Appl. No.: 17/629,557

(22) PCT Filed: Oct. 25, 2021

(86) PCT No.: PCT/KR2021/014989
§ 371 (c)(1),
(2) Date: Jan. 24, 2022

(87) PCT Pub. No.: WO2022/086304
PCT Pub. Date: Apr. 28, 2022

(65) Prior Publication Data
US 2022/0365962 A1    Nov. 17, 2022

(30) Foreign Application Priority Data

Oct. 23, 2020 (KR) .................. 10-2020-0138123
Oct. 22, 2021 (KR) .................. 10-2021-0142157

(51) Int. Cl.
*G06F 16/53* (2019.01)
*G06F 3/04847* (2022.01)

(52) U.S. Cl.
CPC .......... *G06F 16/53* (2019.01); *G06F 3/04847* (2013.01)

(58) Field of Classification Search
CPC .............................. G06F 16/53; G06F 3/04847

USPC ......................................................... 382/110
See application file for complete search history.

(56) References Cited

U.S. PATENT DOCUMENTS

| 2006/0122468 A1* | 6/2006 | Tavor | G16H 20/60 600/300 |
|---|---|---|---|
| 2012/0254196 A1* | 10/2012 | Abramski | G16H 20/60 707/748 |
| 2018/0149583 A1* | 5/2018 | Pi | G06Q 50/10 |
| 2022/0365962 A1* | 11/2022 | Kim | G06F 16/587 |

FOREIGN PATENT DOCUMENTS

| JP | 2019-054378 | 4/2019 |
|---|---|---|
| KR | 10-1563694 | 10/2015 |
| KR | 10-2017-0031517 | 3/2017 |
| KR | 10-2017-0083382 | 7/2017 |
| KR | 10-2108535 | 6/2020 |

OTHER PUBLICATIONS

Search Report by ISA/KR on Feb. 4, 2022 for the corresponding International Patent Application No. PCT/KR2021/014989 (3 Pages).

* cited by examiner

*Primary Examiner* — Gabriel I Garcia
(74) *Attorney, Agent, or Firm* — Occhiuti & Rohlicek LLP

(57) ABSTRACT

Provided are a food-information inputting method and apparatus. The food-information inputting method may include operating in a photographing mode where an input guide and an input button moved along the input guide are displayed on a photographing screen; and receiving at least one piece of food information using the input guide and the input button, while operating in the photographing mode.

29 Claims, 21 Drawing Sheets

FIG. 21
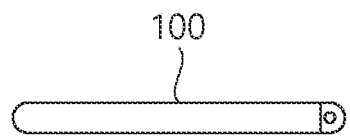

METHOD AND APPARATUS FOR INPUTTING FOOD INFORMATION

CROSS-REFERENCE TO RELATED APPLICATIONS

This application is a 371 U.S. national stage application of International Application no. PCT/KR2021/014989, filed Oct. 25, 2021, which claims the benefit of the filing date of Korean Application No. 10-2020-0138123, filed Oct. 23, 2020, and Korean Application No. 10-2021-0142157, filed Oct. 22, 2021, the contents of which are hereby incorporated by reference in their entirety.

TECHNICAL FIELD

The present disclosure relates to a technology for providing information input convenience to a user and, more particularly, to a method and apparatus for allowing a user to conveniently input food information.

BACKGROUND ART

Recently, interest in health is increasing, but people suffering from being overweight or obese are also increasing. Being overweight or obese is a serious problem that causes various diseases such as diabetes and high blood pressure.

Therefore, in order to solve the problems of being overweight or obese, it is necessary to analyze one's own eating habits. People generally have foods they like and dislike, but cannot remember the types of food and times they actually eat. Thus, in order to analyze one's own eating habits, it is necessary to identify food that is actually consumed, and to analyze an individual's eating habits according to information about the identified food.

For instance, in order to identify the actually consumed food, a user should input food information using a mobile terminal or input apparatus. Here, the user executes a food-related application or a general photographing mode executed in the mobile terminal to photograph the food. At this time, since the user should search for a photographed food image in the food-related application and then input food information, this causes inconvenience. Further, when the food is photographed in the general photographing mode, the user should find a photographed food image in an album, upload the found food image to the food-related application, find the uploaded food image again, and then input food information, thus causing inconvenience. Since food photographing and food information input are separate operations, it is inconvenient. Therefore, after the user photographs several food images, the frequency of uploading food information rapidly decreases.

There may be cases where the user only photographs food and then inputs food information later. If the period of photographing the food image has elapsed, the user may not remember food information which is to be input during photographing, so the food information may not be recorded, or incorrect food information may be uploaded, thus causing an error in analyzing the eating habits. Furthermore, even if the user wants to input various pieces of food information for the photographed food image, only some fixed food information may be inevitably input for each application. In this case, the number of pieces of food information is limited, so the user's eating habits cannot be accurately analyzed.

As such, the user's inconvenience is increased, so satisfaction with service of analyzing an individual's eating habits through food information input is being deteriorated.

DISCLOSURE

Technical Problem

An embodiment of the present disclosure is to provide a food-information inputting method and apparatus, intended to conveniently input food information in addition to photographing on a photographing screen, when a user inputs food information.

Another embodiment of the present disclosure is to provide a food-information inputting method and apparatus, intended to conveniently input food information through a User Interface (UI) related to recognized food, when food information is input in addition to photographing on a photographing screen.

A further embodiment of the present disclosure is to provide a food-information inputting method and apparatus, intended to automatically perform photographing if a predetermined condition is satisfied, during an operation in a photographing mode.

The objects of the present disclosure are not limited by the foregoing, and other various objects are anticipated herein.

Technical Solution

In an aspect, a food-information inputting method performed by a food-information input apparatus may include operating in a photographing mode where an input guide and an input button moved along the input guide are displayed on a photographing screen; and receiving at least one piece of food information using the input guide and the input button, while operating in the photographing mode.

In the receiving of at least one piece of food information, the food information may be received according to a location where the activated input button is deactivated on the input guide, in the state where a user activates the input button displayed on the photographing screen, while operating in the photographing mode.

The food-information inputting method may further include displaying at least one piece of food information corresponding to a location where the input button is activated by the user on the input guide.

In the displaying of at least one piece of food information on the photographing screen, the food information corresponding to the location where the input button may be activated by the user on the input guide is displayed on the photographing screen in a preset size or more.

In the receiving of at least one piece of food information, at least one piece of food information may be selectively received according to a moving direction in which the activated input button is moved to be deactivated on the input guide, in the state where the user activates the input button displayed on the photographing screen.

In the receiving of at least one piece of food information, at least one piece of food information may be selectively received according to a moving distance and a moving direction in which the activated input button is moved to be deactivated on the input guide, in the state where the user activates the input button displayed on the photographing screen.

The at least one piece of food information may include at least one piece of information selected from among food amount information, food type information, food calorie information, food nutrient information, food menu information, eater information, intake goal information, intake schedule information, intake time information, intake satisfaction information, food time information suitable for a preset input purpose, food location information suitable for the preset input purpose, food handler information, food-waste disposal information, pre-meal input information, post-meal input information, bookmark information, and information about items stored in a wish list.

The food-information inputting method may further include displaying at least one selected from among user allergy effect, skin nutrition, growth nutrition, disease effect, aging effect, diet effect, expected intake calorie compared to target calorie, salinity, converted value of food, food-cost information, food-environment information, carbon value information, resource value information, carbon emission, operating-cost loss cost, food-ingredient information, a pre-meal input button, a post-meal input button, a bookmark input button, and a wish-list storage button, which are related to the at least one piece of input food information.

The food-information inputting method may further include recognizing food displayed on the photographing screen, and at least one piece of input food information may be related to the recognized food.

In the receiving of at least one piece of food information, a unit of the food displayed on the input button may be changed according to a type of the recognized food, and information about an amount of recognized food may be input based on the changed unit of food.

The food-information inputting method may further include displaying an input limit range for the recognized food.

The food-information inputting method may further include adjusting a minimum value and a maximum value of the displayed input limit range, and the input unit of the food information may be varied according to the minimum value and the maximum value of the adjusted input limit range.

The food-information inputting method may further include calculating and displaying intake-goal information considering the user's characteristics according to the recognized food; receiving intake-schedule information about the recognized food from the user; and displaying a ratio of the input intake-schedule information to the displayed intake-goal information.

The food-information inputting method may further include displaying success or failure of the intake goal based on the input intake-schedule information for the displayed intake-goal information, after the user takes the recognized food.

The food-information inputting method may further include analyzing a food image of the recognized food to determine whether it is before or after a meal; and recording the food image as a users food review before the meal when the food is photographed before the meal, or recording the food image as a user's food review after the meal when the food is photographed after the meal.

The food-information inputting method may further include displaying a recognizable food candidate type based on a type of the recognized food.

The food-information inputting method may further include searching for a restaurant which provides the recognized food based on a location of the food-information input apparatus; and correcting and displaying the received food information based on menu information in the searched restaurant.

The food-information inputting method may further include searching for a restaurant which provides the recognized food based on a location of the food-information input apparatus; and ordering food corresponding to the input food information based on menu information in the searched restaurant.

The food-information inputting method may further include providing a preset incentive for the input food information to the user, when the food information is input.

In another aspect, a food-information inputting method performed by a food-information input apparatus may include operating in a photographing mode where an input button is displayed on a photographing screen; checking whether to satisfy a preset photographing guide condition while operating in the photographing mode; and performing a photographing operation if the preset photographing guide condition is satisfied.

The food-information inputting method may further include recognizing food displayed on the photographing screen; and receiving food information about the recognized food.

The preset photographing guide condition may be at least one condition selected from among a condition where the recognized food and the food-information input apparatus are parallel to each other, a condition where the food-information input apparatus is horizontal, a condition where the food-information input apparatus is located vertically above the recognized food, and a condition where the food-information input apparatus is moved.

The food-information inputting method may further include displaying photographing accuracy on the screen based on a relative inclination between the recognized food and the food-information input apparatus.

The food-information inputting method may further include providing a preset incentive for a photographing operation to the user.

The food-information inputting method may further include analyzing a photographing image of the recognized food to determine whether it is before or after a meal; and recording the photographed image as a user's food review before the meal when the food is photographed before the meal, or recording the photographed image as a users food review after the meal when the food is photographed after the meal.

The food-information inputting method may further include displaying a recognizable food candidate type based on a type of the recognized food.

The food-information inputting method may further include searching for a restaurant which provides the recognized food based on a location of the food-information input apparatus; and correcting and displaying the received food information based on menu information in the searched restaurant.

The food-information inputting method may further include searching for a restaurant which provides the recognized food based on a location of the food-information input apparatus; and ordering food corresponding to the input food information based on menu information in the searched restaurant.

In a further aspect, a food-information input apparatus may include a camera; a display; a memory configured to store one or more programs; and a processor configured to execute the one or more stored programs, and the processor may be operated in a photographing mode where an input guide and an input button moved along the input guide are displayed on a photographing screen, through the display; and at least one piece of food information may be input using the input guide and the input button through the camera, while the processor is operated in the photographing mode.

In another aspect, a food-information input apparatus may include a food-information input apparatus including a camera; a display; a memory configured to store one or more programs; and a processor configured to execute the one or more stored programs, and the processor may be operated in a photographing mode where an input button is displayed on a photographing screen, through the display, it may be checked whether to satisfy a preset photographing guide condition, while the processor is operated in the photographing mode, and photographing may be performed through the camera if the preset photographing guide condition is satisfied.

In addition, another method and another system for implementing the present disclosure, and a computer-readable recording medium for recording a computer program for executing the method may be further provided.

Advantageous Effects

According to an embodiment of the present disclosure, it is possible to conveniently input food information in addition to photographing on a photographing screen, when a user should input food information.

According to another embodiment of the present disclosure, it is possible to conveniently input food information through a User Interface (UI) related to recognized food, when food information is input in addition to photographing on a photographing screen.

According to a further embodiment of the present disclosure, it is possible to automatically perform photographing if a predetermined condition is satisfied, during an operation in a photographing mode.

The effects of the present disclosure are not limited by the foregoing, and other various effects are anticipated herein.

DESCRIPTION OF DRAWINGS

FIG. 21 is a diagram illustrating a photographing operation according to another embodiment of the present disclosure.

MODE FOR DISCLOSURE

Figure 1:
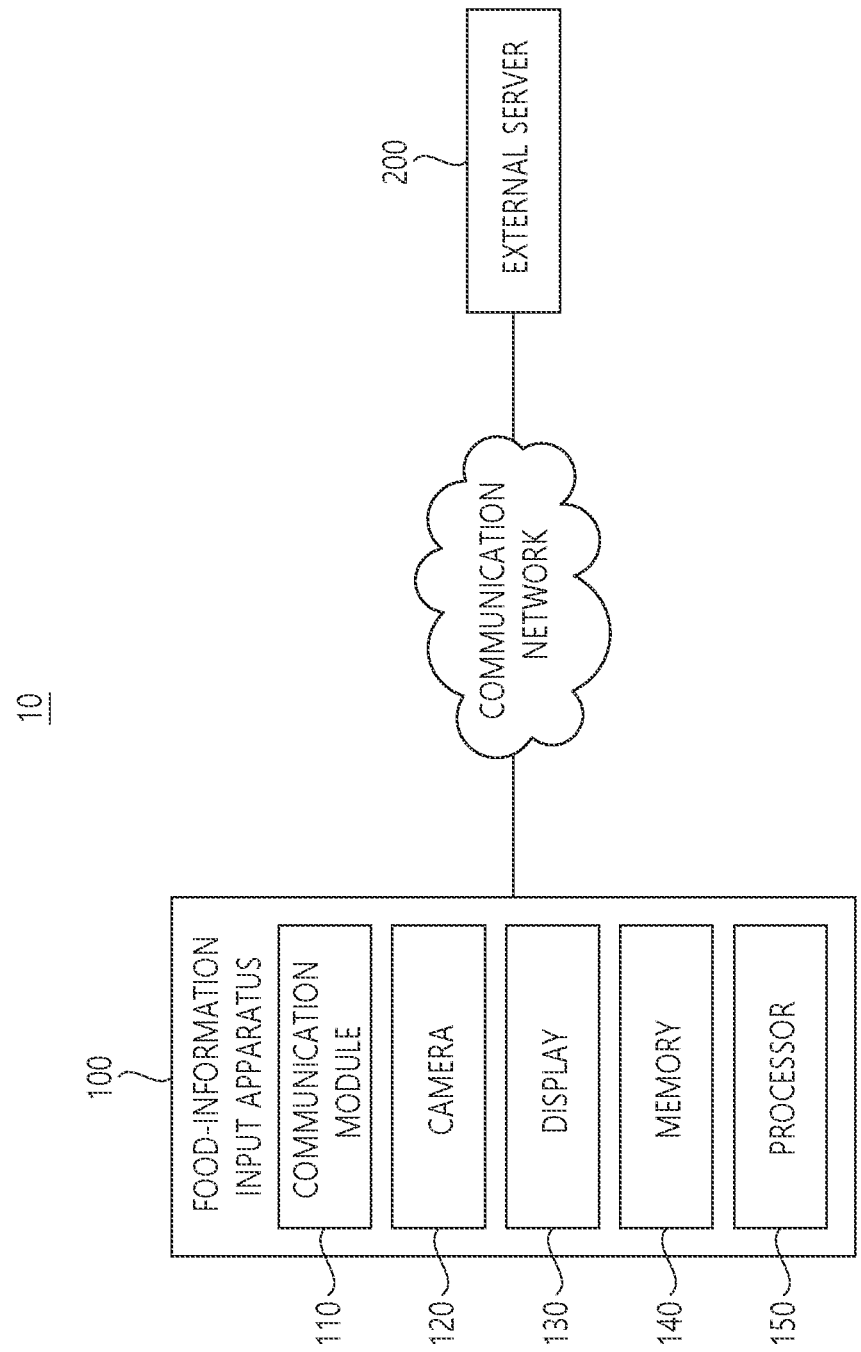
FIG. 1 is a diagram illustrating the configuration of a food information input system according to an embodiment of the present disclosure.

The above and other objectives, features, and advantages of the present disclosure will be easily understood from the following preferred embodiments in conjunction with the accompanying drawings. However, the disclosure may be embodied in different forms without being limited to the embodiments set forth herein. Rather, the embodiments disclosed herein are provided to make the disclosure thorough and complete and to sufficiently convey the spirit of the present disclosure to those skilled in the art.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated components, but do not preclude the presence or addition of one or more other components. Like reference numerals refer to like components throughout the specification, and "and/or" includes each and every combination of one or more of the recited components. It will be understood that, although the terms "first", "second", etc. may be used herein to describe various components, these components should not be limited by these terms. These terms are only used to distinguish one component from another component. For instance, a first component could be termed a second component without departing from the teachings of the present disclosure. Similarly, the second component could also be termed the first component.

Unless otherwise defined, all terms including technical and scientific terms used herein have the same meaning as commonly understood by one of ordinary skill in the art to which the present disclosure pertains. It will be further understood that terms used herein should be interpreted as having a meaning that is consistent with their meaning in the context of this specification and the relevant art and will not be interpreted in an idealized or overly formal sense unless expressly so defined herein.

FIG. 1 is a diagram illustrating the configuration of a food information input system according to an embodiment of the present disclosure.

First, referring to FIG. 1, the food information input system 10 according to the present disclosure may include a food-information input apparatus 100 and an external server 200 which communicates with the food-information input apparatus 100.

The food-information input apparatus 100 may include a communication module 110, a camera 120, a display 130, a memory 140, and a processor 150.

The communication module 110 may include one or more modules which enable communication between the food-information input apparatus 100 and the wireless communication system, or between the food-information input apparatus 100 and the external server 200. Furthermore, the communication module 110 may include one or more modules which connect the food-information input apparatus 100 to one or more networks.

The camera 120 may photograph an image or a video by a user's operation. Here, the camera 120 may photograph the image or video of food before and after a meal by a user's operation. The camera 120 may comprise a single camera, a plurality of cameras, a single image sensor, or a plurality of image sensors. The camera 120 may be at least one selected from a group including at least one 2D camera, at least one 3D camera, at least one stereo camera, and at least one image sensor.

The display 130 may form a layer structure with a touch sensor or may be integrated with a touch sensor, thus implementing a touch screen. Such a touch screen may provide an input interface between the food-information input apparatus 100 and a user, and may simultaneously provide an output interface between the food-information input apparatus 100 and the user.

The memory 140 may store data which support various functions of the food-information input apparatus 100. The memory 140 may store one or more programs driven in the food-information input apparatus 100, multiple application programs or applications, data for operating the food-information input apparatus 100, and commands. At least some of the application programs may be downloaded from the external server 200 through wireless communication. Furthermore, at least some of the application programs may be present for the basic function of the food-information input apparatus 100. Meanwhile, the application program may be stored in the memory 140 and be installed on the food-information input apparatus 100 to perform the operation (or function) of the food-information input apparatus 100 by the processor 150.

The processor 150 may generally control the overall operation of the food-information input apparatus 100 as well as an operation related to the application program. The processor 150 may process signals, data, or information which are input or output through the above-described components or drive the application program stored in the memory 140, thus providing appropriate information or functions to a user.

In an embodiment, the processor 150 may be operated in a photographing mode where an input guide and an input button moved along the input guide are displayed on a photographing screen through the display 130 by executing one or more programs stored in the memory 140, and may receive at least one piece of food information using the input guide and the input button through the camera 120 while the processor is operated in the photographing mode.

In an embodiment, the processor 150 may be operated in the photographing mode where the input button is displayed on the photographing screen through the display 130 by executing one or more programs stored in the memory 140, may check whether to satisfy a preset photographing guide condition while the processor is operated in the photographing mode, and may perform a photographing operation through the camera 120 if the preset photographing guide condition is satisfied.

Furthermore, the processor 150 may control at least some of the components described with reference to FIG. 1 so as to drive the application program stored in the memory 140. Moreover, the processor 150 may operate in combination with at least two or more components among the components included in the food-information input apparatus 100 so as to drive the application program. In this regard, the processor 150 will be described later with reference to FIGS. 2 to 20.

Hereinbefore, the configuration of the food information input system 10 according to the present disclosure has been described with reference to FIG. 1. The number of the components of the food information input system 10 may be less or more than that of the components shown in FIG. 1.

Hereinafter, food-information inputting methods according to embodiments of the present disclosure will be described with reference to FIGS. 2 to 11.

Figure 2:
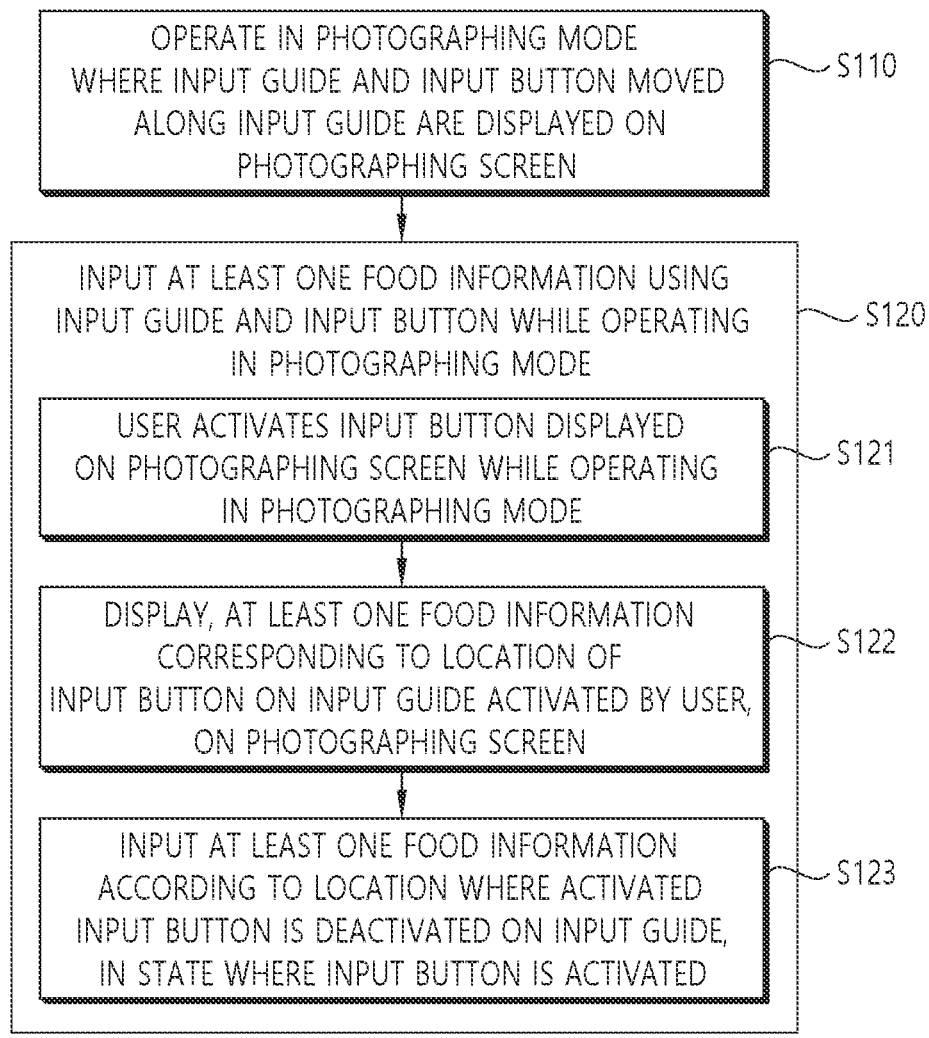
FIG. 2 is a flowchart illustrating a food-information inputting method according to an embodiment of the present disclosure.

FIG. 2 is a flowchart illustrating a food-information inputting method according to an embodiment of the present disclosure.

As shown in FIG. 2, the food-information inputting method according to an embodiment of the present disclosure may be performed by at least one processor of the food-information input apparatus 100 or by a computer which is the food-information input apparatus 100.

First, the food-information input apparatus 100 may be operated in the photographing mode (S110). The food-information input apparatus 100 may be operated in the photographing mode where the input guide and the input button moved along the input guide are displayed on the photographing screen of the display 130. The photographing screen may be the photographing screen of the food-information input application executed by the food-information input apparatus 100, or be the photographing screen of the photographing application executed by the food-information input apparatus 100, and is not limited to a specific photographing screen.

Further, while the food-information input apparatus 100 is operated in the photographing mode, at least one piece of food information is input into the food-information input apparatus using the input guide and the input button (S120). Here, at least one piece of food information may include general food information, information about leftovers which remain after a meal, or information about food waste together with a photographing image or a photographing video. For example, at least one piece of food information may include at least one piece of information among information about a food amount, information about a food type, information about food calories, information about a food nutrient, information about a food menu, information about an eater, information about an intake goal, information about an intake schedule, information about intake time, information about intake satisfaction, information about food time suitable for a preset input purpose, information about a food location suitable for a preset input purpose, information about a food handler, information about food-waste disposal, input information before a meal, input information after a meal, information about a bookmark, and information about items stored in a wish list together with a photographing image or a photographing video.

A detailed operation of step S120 is as follows: while the food-information input apparatus 100 is operated in the photographing mode, a user may activate the input button displayed on the photographing screen (S121).

Subsequently, the food-information input apparatus 100 may display, at least one piece of food information corresponding to the location of the input button on the input guide activated by the user, on the display (S122). Further, the food-information input apparatus 100 may display, at least one piece of food information corresponding to the location of the input button on the input guide activated by the user, on the photographing screen in a preset size or more. Here, the operation of displaying at least one piece of food information on the display is not an essential operation. Depending on a user's setting, the display operation may or may not be performed.

Thereafter, the food-information input apparatus 100 may receive at least one piece of food information according to the location where the activated input button is deactivated on the input guide, in the state where the user activates the input button (S123). For instance, in the state where the user touches to activate the input button, the input button is dragged along the input guide and then the touch is released, so that the input button may be deactivated. Then, the food-information input apparatus 100 may receive food information according to the location where the input button is deactivated on the input guide. Alternatively, in the state where the user touches to activate the input button, the user may deactivate the input button by releasing the touch from a touched location instead of dragging the input button along the input guide. Then, the food-information input apparatus 100 may receive food information according to the location where the input button is deactivated on the input guide, in other words, the location where the user touches and then releases the touch.

Meanwhile, a detailed process of inputting the food information is as follows.

In some embodiments, the food-information input apparatus 100 may selectively receive at least one piece of food information according to a moving direction in which the activated input button is moved to be deactivated on the input guide, in the state where the user activates the input button displayed on the photographing screen. For instance, the type of the food information may be set differently for each specific moving direction. The user may selectively input at least one piece of food information according to the type of the food information which is set differently for each moving direction on the input guide.

In some embodiments, the food-information input apparatus 100 may selectively receive at least one piece of food information according to the moving distance and the moving direction in which the activated input button is moved to be deactivated on the input guide, in the state where the user activates the input button displayed on the photographing screen. For instance, the type of the food information may be set differently for each specific moving direction. Furthermore, the information value of the food information may be changed for each moving distance. The user may consider the type of the food information which is set differently according to the moving direction on the input guide, and adjust the moving distance to allow the information value of the food information to be selectively input.

In some embodiments, the food-information input apparatus 100 may receive at least one piece of food information according to at least one piece of combination information of multimodal-interface input information and the location where the activated input button is moved to be deactivated on the input guide, in the state where the user activates the input button displayed on the photographing screen. The multimodal-interface input information may include at least one among a user's voice, facial expression, gesture, behavior, gaze, and screen-touch movement.

Thereafter, the food-information input apparatus 100 may display at least one of user allergy effect, skin nutrition, growth nutrition, disease effect, aging effect, diet effect, expected intake calories compared to target calories, salinity, converted value of food, food-cost information, food-environment information, carbon value information, resource value information, carbon emission, operating-cost loss cost, food-ingredient information, a pre-meal input button, a post-meal input button, a bookmark input button, and a wish-list storage button, which are related to the at least one piece of input food information.

FIGS. 3 to 6 are diagrams illustrating a food-information input operation according to an embodiment of the present disclosure.

The food-information input apparatus 100 may receive food information through steps 310 to 330.

Figure 3:
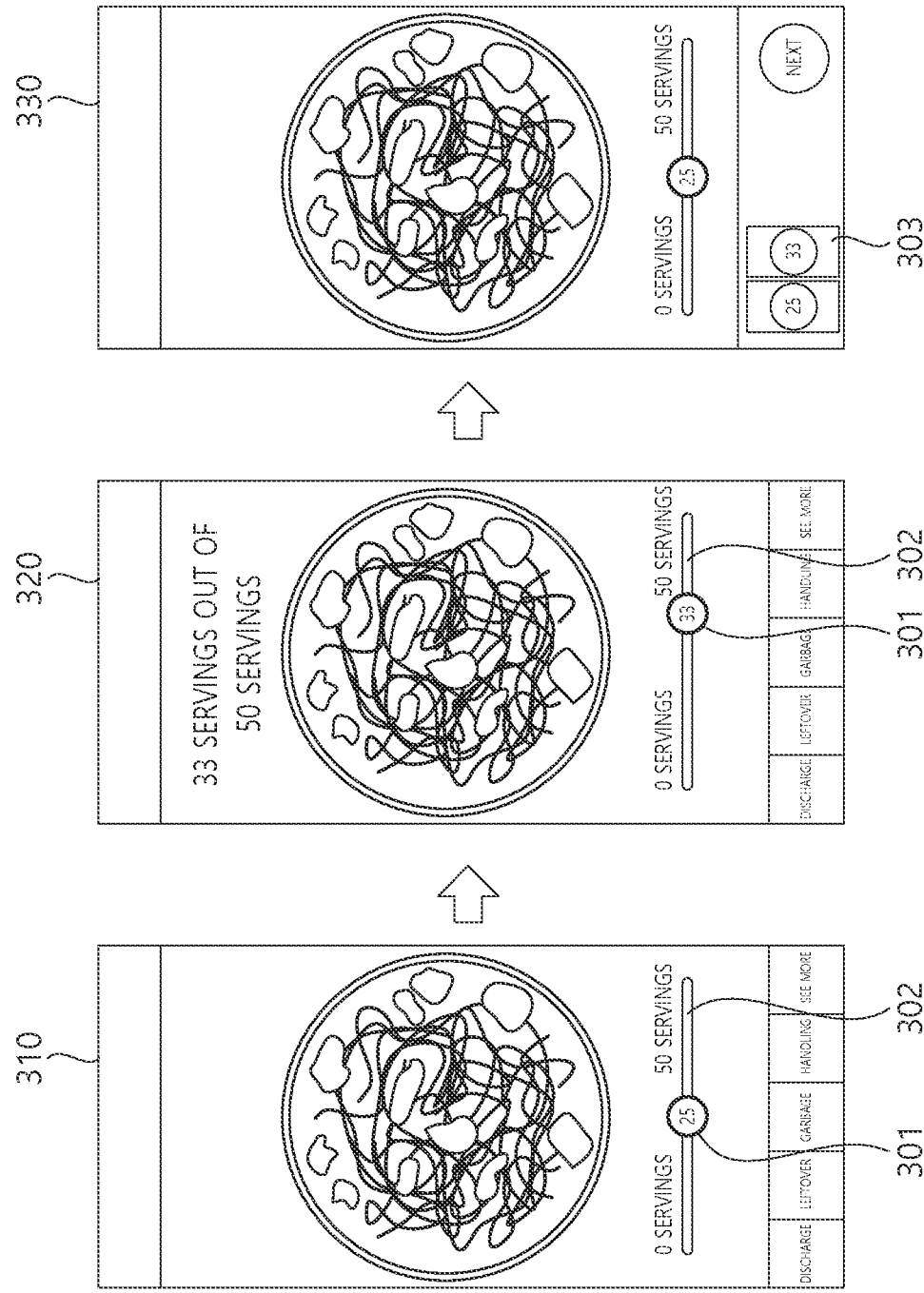
FIGS. 3 to 6 are diagrams illustrating a food-information input operation according to an embodiment of the present disclosure.

As shown in FIG. 3, in step 310, the food-information input apparatus 100 is operated in the photographing mode where the input guide 302 and the input button 301 moved along the input guide 302 are displayed on the photographing screen. Here, an input range related to the food information may be displayed on the input guide 302. For instance, the input guide 302 may display the input range from 0 servings to 50 servings, which is a unit related to spaghetti. An initial input value (e.g. 25 servings corresponding to 50%) corresponding to an initial location on the input guide 302 may be displayed on the input button 301, or an input value which is preset by the user may be displayed on the input button.

In step 320, the food-information input apparatus 100 may check a location of the input button which is moved on the input guide 302, when the user drags and moves the input button 301 in the state where it is activated. Furthermore, the food-information input apparatus 100 may display a food information value (e.g. 33 servings) corresponding to the location of the input button 301 which is moved along the input guide 302, in a size equal to or more than a preset size. Here, the food information value corresponding to the location of the moved input button 301 may be displayed in any area of the display or the input button 301, without being limited to a specific display area.

In step 330, the food-information input apparatus 100 may receive food information according to the location in which the activated input button 301 is deactivated on the input guide 302, in the state where the user activates the input button 301 through step 320. For instance, in the state where the user activates the input button 301 through step 320, the activated input button 301 may be dragged and moved to the location of 33 servings within the range from 0 servings to 50 servings, and then may deactivate the input button 301 in the location of 33 servings. Then, the food-information input apparatus 100 may check the location of the input button 301 deactivated by the user on the input guide 302 to correspond to 33 servings, and may receive the food information as 33 servings according to the checked location.

Figure 4:
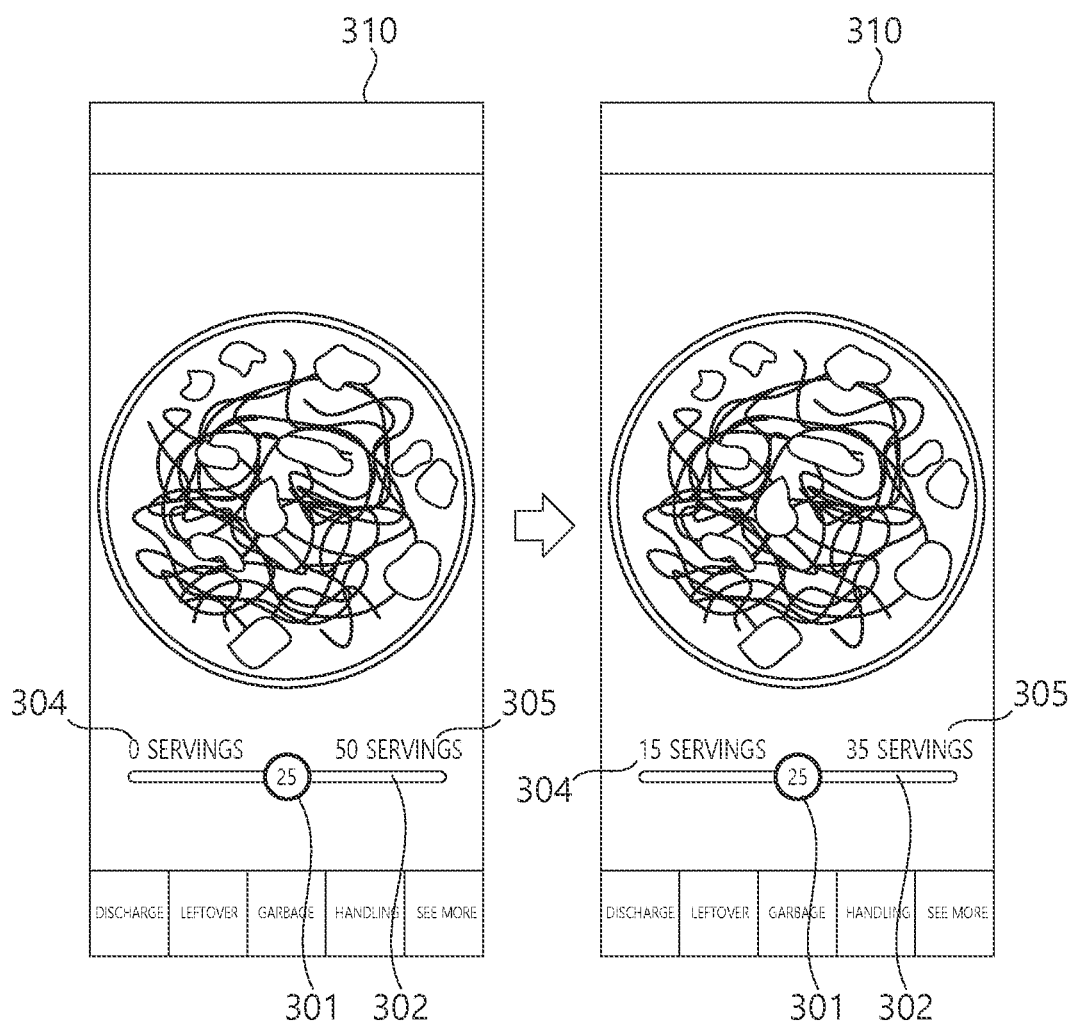

Meanwhile, as shown in FIG. 4, in step 310, the food-information input apparatus is operated in the photographing mode where the input guide 302 and the input button 301 moved along the input guide 302 are displayed on the photographing screen. Here, the input range related to the food information may be displayed on the input guide 302. For instance, the input guide 302 may display the input range from 0 servings to 50 servings, which is the unit related to spaghetti. The initial input value (e.g. 25 servings corresponding to 50%) corresponding to the initial location on the input guide 302 may be displayed on the input button 301, or a preset input value may be displayed on the input button by the user.

The food-information input apparatus 100 may display an input limit range for recognized food. The input limit range may include a minimum value 304 and a maximum value 305. Further, the food-information input apparatus 100 may adjust the minimum value 304 and the maximum value 305 of the displayed input limit range. The input limit range may be increased or reduced. The input unit of the food information may be varied to be increased or reduced according to the minimum value 304 and the maximum value 305 of the adjusted input limit range.

For instance, the food input apparatus 100 may display the minimum value 304 of the input limit range as 0 servings, and display the maximum value 305 as 50 servings. If a preset adjusting operation (e.g. the operation of pressing the photographing screen) of the input limit range is sensed, the food input apparatus 100 may adjust the minimum value 304 of the input limit range as 15 servings, and adjust the maximum value 305 as 35 servings. The input limit range may be adjusted from 50 servings to 20 servings. As the input limit range is adjusted from 50 servings to 20 servings, the input unit of the food information may be more closely changed.

Figure 5:
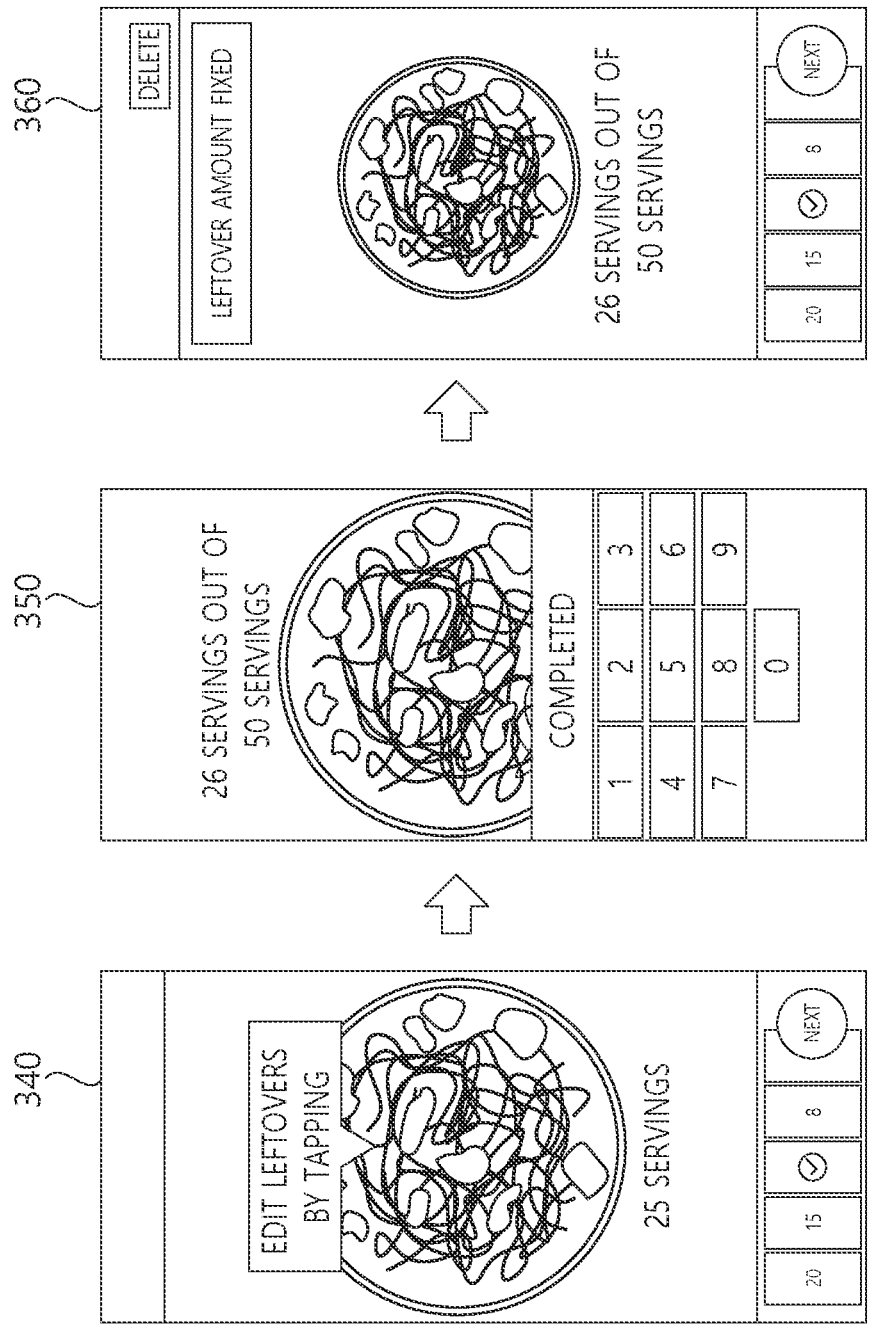

Meanwhile, as shown in FIG. 5, the food-information input apparatus 100 may correct input food information, through steps 340 to 360.

In step 340, the food-information input apparatus 100 may display food information which is previously input by the user, and correct the food information which is previously input through a user's tap operation. For instance, the user may import a record corresponding to 25 servings among 20 servings, 15 servings, 25 servings, and 8 servings, which are previously input food information.

Further, in step 350, if the food-information input apparatus 100 displays food information (e.g. 25 servings) which is previously input by the user, the user may correct the previously input food information into another food information value (e.g. 26 servings).

Thereafter, in step 360, the food-information input apparatus 100 may update the previously recorded food information (e.g. 25 servings) to food information (e.g. 26 servings) corrected by the user.

Figure 6:
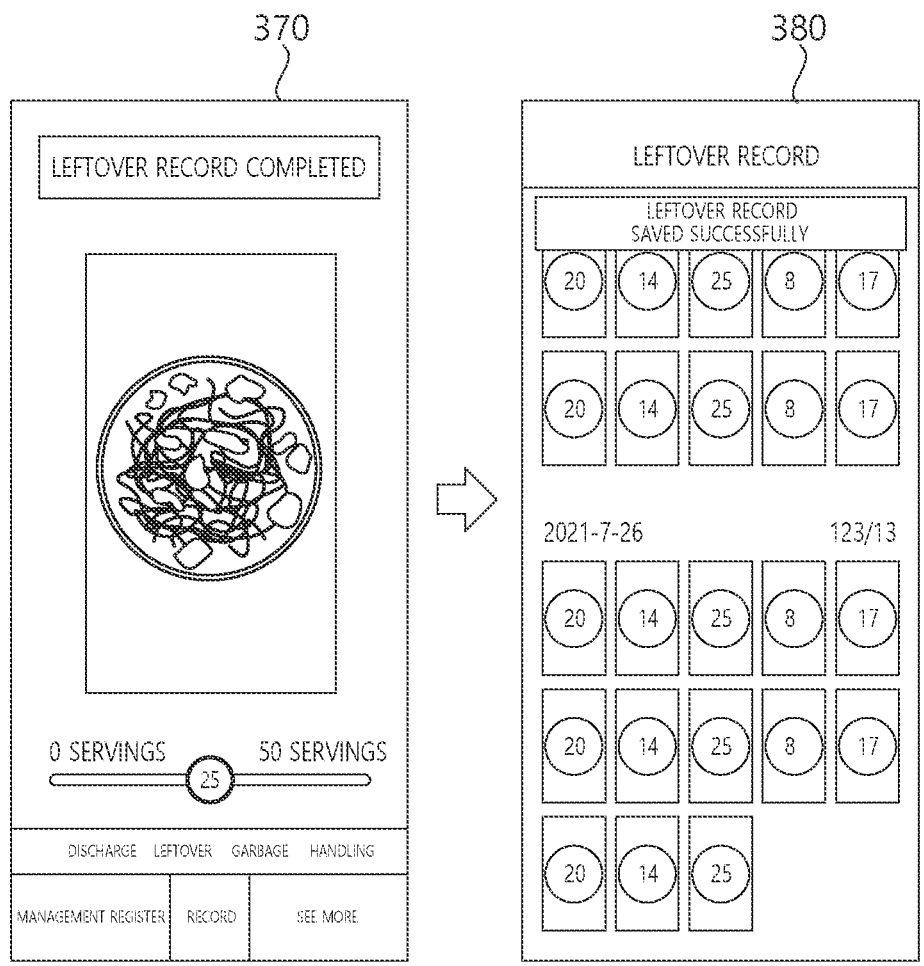

Meanwhile, as shown in FIG. 6, the food-information input apparatus 100 may complete the record of the food information related to leftovers which are input by the user, through steps 370 to 380.

In step 370, the food-information input apparatus 100 may record the food information which is input through steps 310 to 330. Alternatively, the food-information input apparatus 100 may correct the previously recorded food information, and may update and record the corrected food information, through steps 340 to 360.

In step 380, the food-information input apparatus 100 may sort food information by the date when the record of leftovers is stored, and display the food information to the user. For instance, the food-information input apparatus 100 may display food information (e.g. 20 servings, 14 servings, 25 servings, 8 servings, 17 servings, etc.) which is input on Jul. 26, 2021. The user may select a different day, and check food information which is input on the different day.

As such, the photographing information may be input and simultaneously the food information may be input, through a user's activating and deactivating operations in the photographing mode. For instance, the activating and deactivating operations may be implemented as touch and touch release operations performed on the photographing screen by the user, drag and drag release operations, press and press release operations, preset double touch operation (or double click operation) and double touch release operation (or double click release operation), operations of simultaneously pressing or releasing two or more input buttons, or simultaneous touch operation (or simultaneous click operation) and simultaneous touch release operation for two or more areas. The activating and deactivating operations may be any activating and deactivating operations for photographing, without being limited to specific activating and deactivating operations. Alternatively, through at least one combination operation of the user's activating and deactivating operations in the photographing mode and the user multimodal interface input operation, the food information may be photographed and input.

Figure 7:
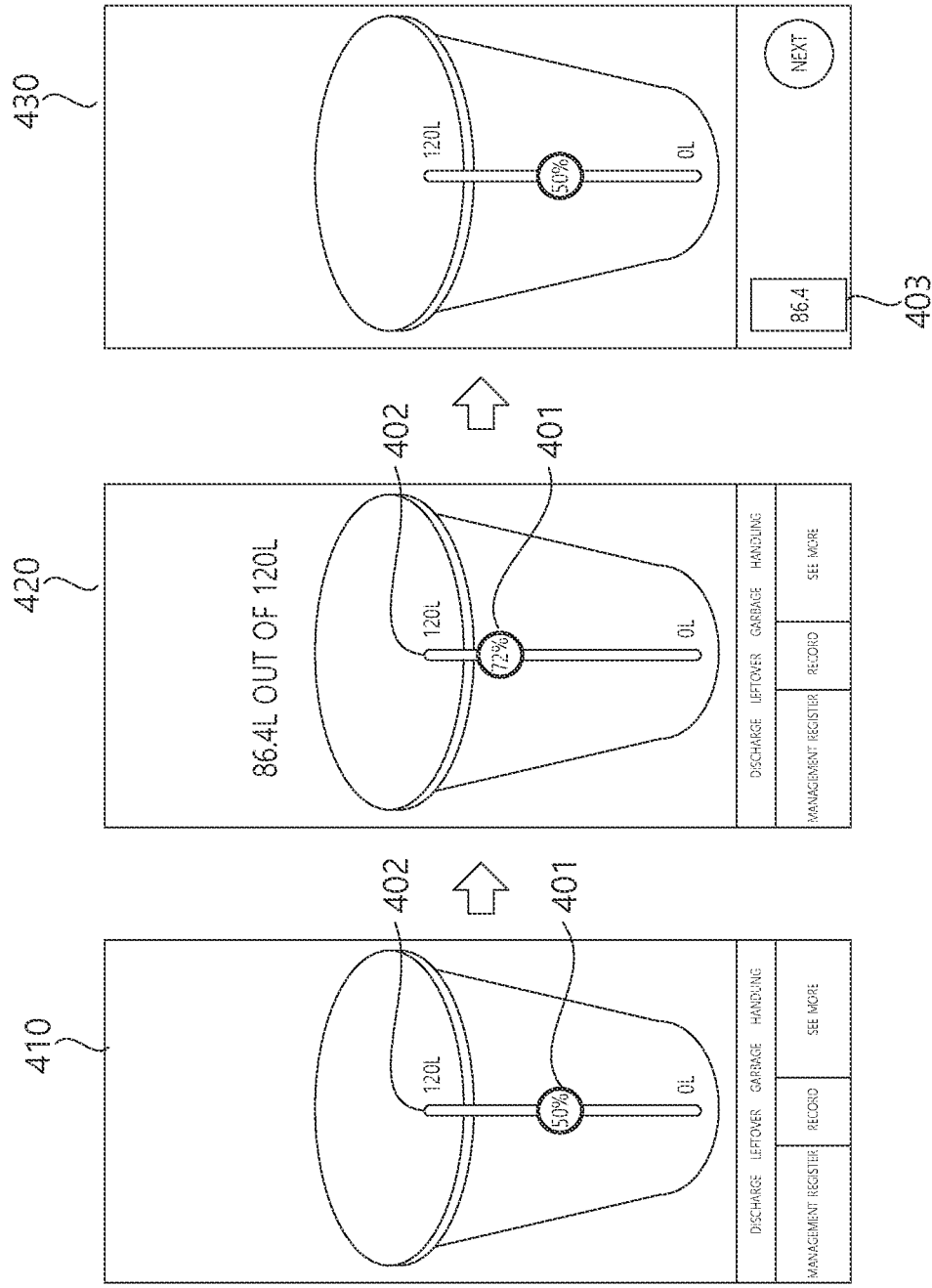
FIGS. 7 to 9 are diagrams illustrating an operation of inputting food information related to the discharge of leftovers according to an embodiment of the present disclosure.
Figure 8:
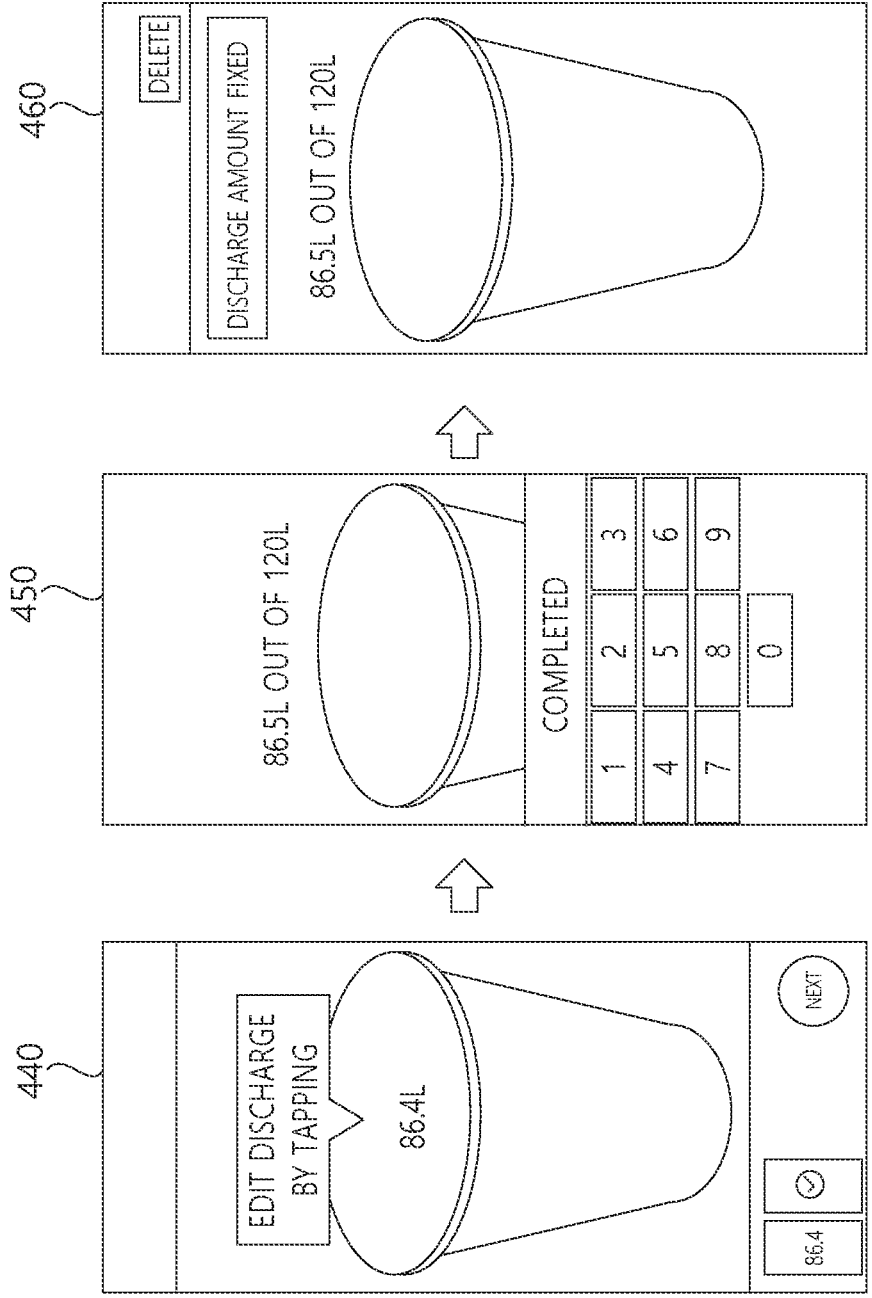
Figure 9:
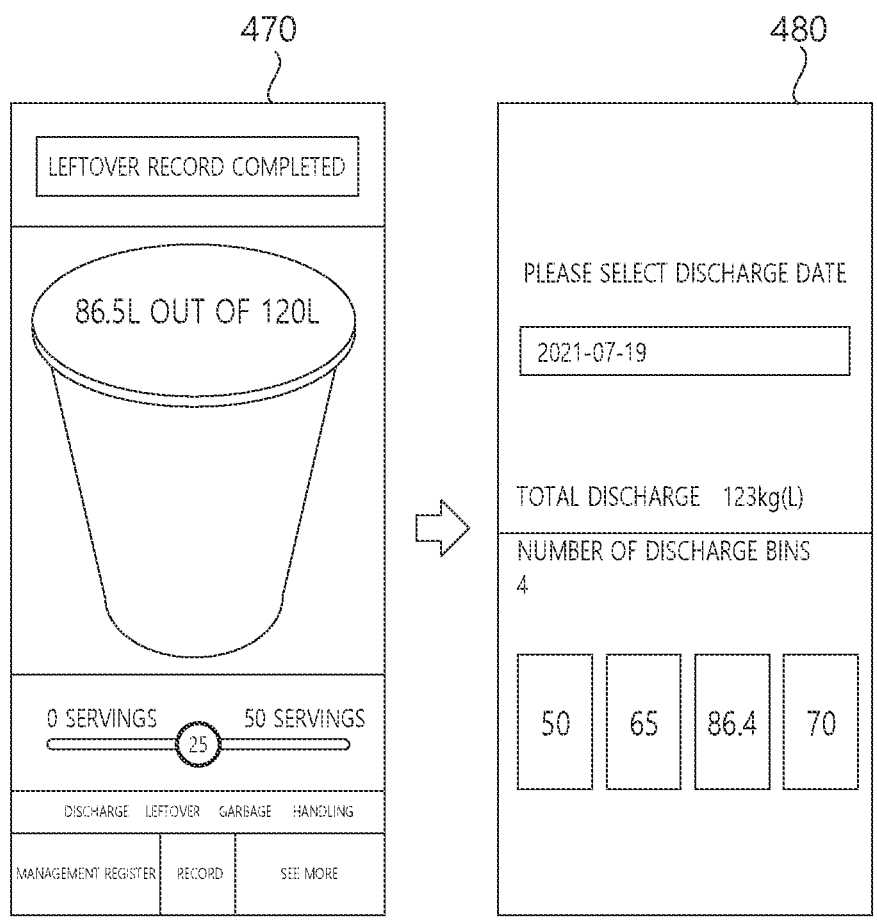

FIGS. 7 to 9 are diagrams illustrating an operation of inputting food information related to the discharge of leftovers according to an embodiment of the present disclosure.

The food-information input apparatus 100 may receive information about leftovers or food waste which is to be discharged, through steps 410 to 430.

As shown in FIG. 7, in step 410, the food-information input apparatus 100 is operated in the photographing mode where the input guide 402 and the input button 401 moved along the input guide 402 are displayed on the photographing screen. Here, the input guide 302 shown in FIG. 3 is arranged in a horizontal direction, while the input guide 402 shown in FIG. 7 is arranged in a vertical direction. The direction of the input guide may be preferably adjusted according to the amount of food which may be intuitively recognized by the user, but is not limited to a specific direction. The input range related to the food-waste information may be displayed on the input guide 402. For instance, the input range from 0 L to 120 L, which is a unit related to the food waste, may be displayed on the input guide 402. An initial input value (e.g. 60 L corresponding to 50%) corresponding to an initial location on the input guide 402 may be displayed on the input button 401, or a preset input value which is preset by the user may be displayed on the input button.

In step 420, the food-information input apparatus 100 may check a location of the input button on the input guide 402, when the user drags and moves the input button 401 in the state where it is activated. Furthermore, the food-information input apparatus 100 may display a food-waste information value (e.g. 86.4 L corresponding to 72%) corresponding to the location of the input button 401 which is moved along the input guide 402, in a size equal to or more than a preset size. Here, the food-waste information value corresponding to the location of the moved input button 401 may be displayed in any area of the display or the input button 401, without being limited to a specific display area.

In step 430, the food-information input apparatus 100 may receive food information according to the location in which the activated input button 401 is deactivated on the input guide 402, in the state where the user activates the input button 401 through step 420. For instance, in the state where the user activates the input button 401 through step 420, the activated input button 401 may be dragged and moved to the location of 86.4 L within the range from 0 L to 120 L, and then may deactivate the input button 401 in the location of 86.4 L. Then, the food-information input apparatus 100 may check the location of the input button 401 deactivated by the user on the input guide 402 to correspond to 86.4 L, and may receive the food-waste information as 86.4 L according to the checked location.

Meanwhile, as shown in FIG. 8, the food-information input apparatus 100 may correct input food information, through steps 440 to 460.

In step 440, the food-information input apparatus 100 may display food-waste information which is previously input by the user, and correct the food-waste information which is previously input through a user's tap operation. For instance, the user may import a record corresponding to 86.4 L among 50 L, 65 L, 75 L, and 86.4 L, which are previously input food-waste information.

Further, in step 450, if the food-information input apparatus 100 displays food-waste information (e.g. 86.4 L) which is previously input by the user, the user may correct the previously input food-waste information into another food-waste information value (e.g. 86.4 L).

Thereafter, in step 460, the food-information input apparatus 100 may update the previously recorded food-waste information (e.g. 86.4 L) to food information (e.g. 86.4 L) corrected by the user.

Meanwhile, as shown in FIG. 9, the food-information input apparatus 100 may complete the discharge record of the food-waste information which is input by the user, through steps 470 to 480.

In step 470, the food-information input apparatus 100 may record the food-waste information which is input through steps 410 to 430. Alternatively, the food-information input apparatus 100 may correct the previously recorded food-waste information, and may update and record the corrected food-waste information, through steps 440 to 460.

In step 480, the food-information input apparatus 100 may store the discharge record of the food waste by a date selected by the user. Further, the food-information input apparatus 100 may sort food-waste information by the date when the discharge record is stored, and display the food-waste information to the user. For instance, the food-information input apparatus 100 may display food-waste information (e.g. SOL, 65 L, 86.4 L, 70 L, etc.) which is input on Jul. 26, 2021. The user may select a different day, and check food-waste information which is input on the different day.

Figure 10:
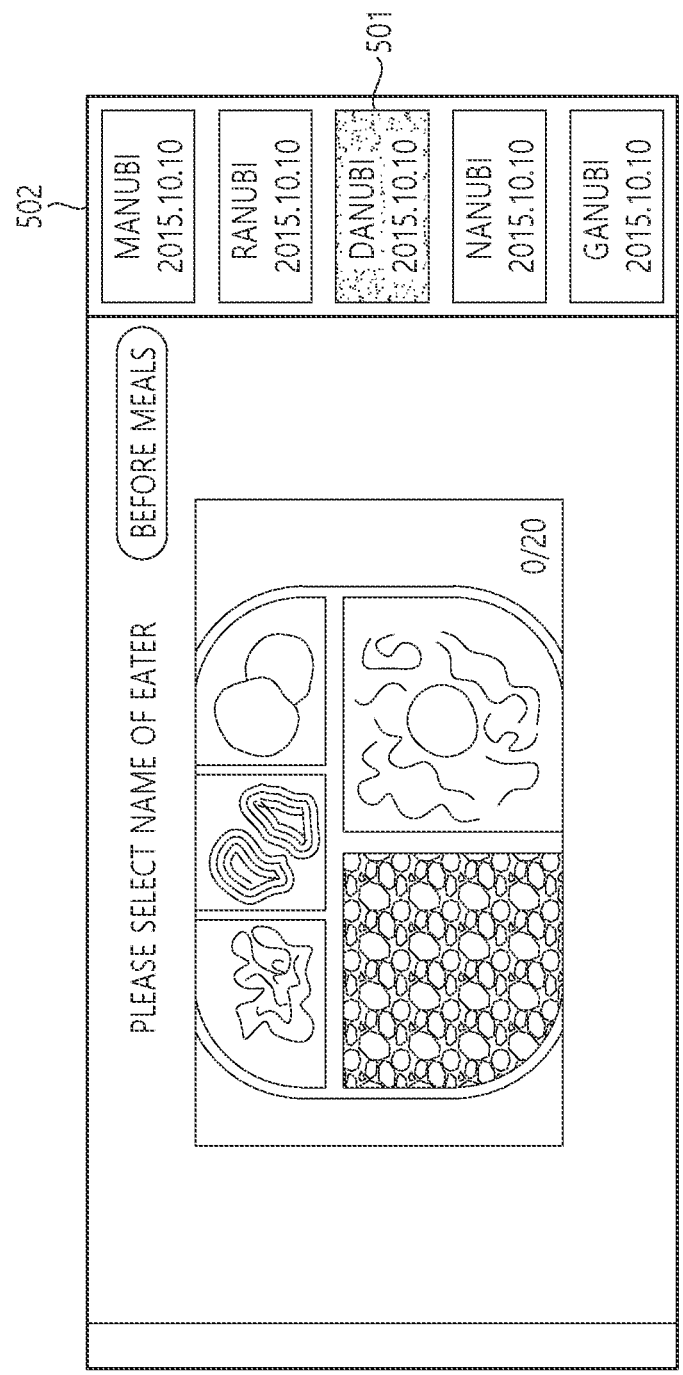
FIGS. 10 and 11 are diagrams illustrating an operation of inputting food information related to food intake information according to an embodiment of the present disclosure.
Figure 11:
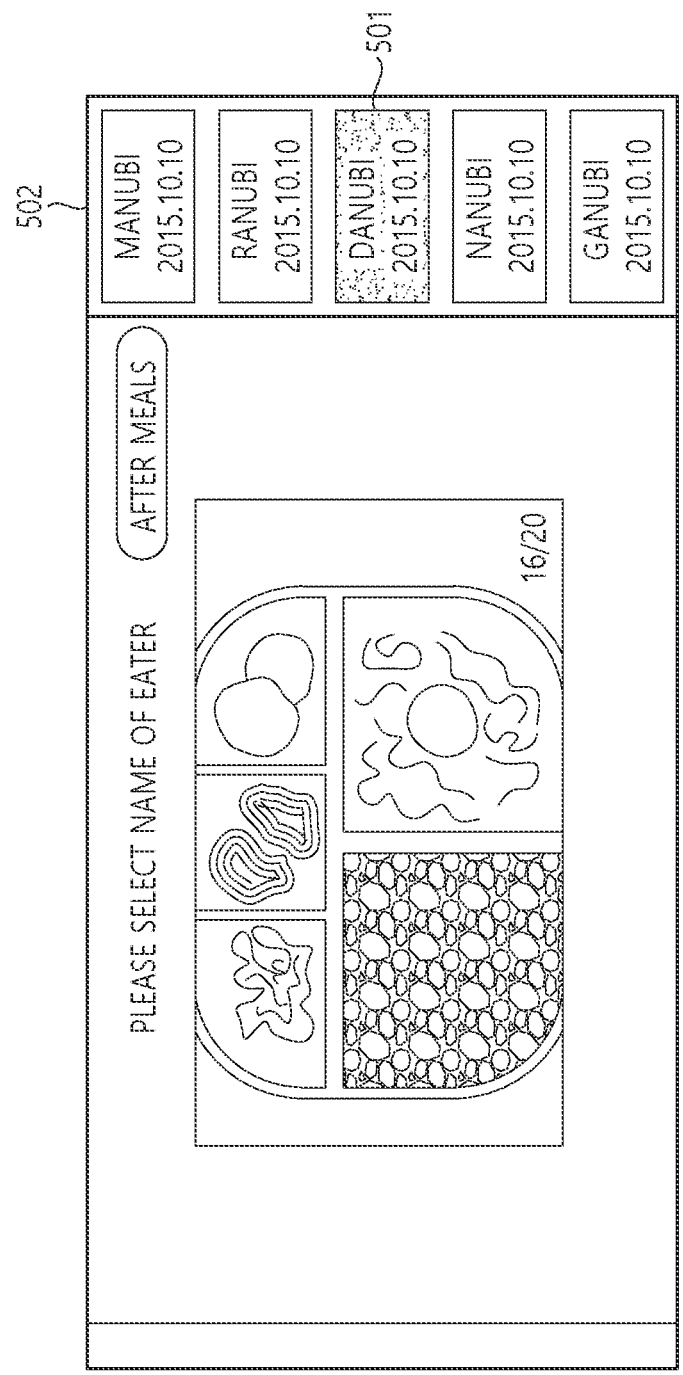

FIGS. 10 and 11 are diagrams illustrating an operation of inputting food information related to food intake information according to an embodiment of the present disclosure.

The food-information input apparatus 100 may receive food information related to intake information when a person is scheduled to take food or has taken food, through steps 510 and 520.

As shown in FIG. 10, in step 510, the food-information input apparatus 100 is operated in the photographing mode where the input guide 502 for inputting intake information and the input button 501 moved along the input guide 502 are displayed on the photographing screen. Here, the input range related to the intake information may be displayed on the input guide 502. For instance, at least one of "Manubi", "Ranubi", "Danubi", and "Nanubi" may be displayed on the input button 501 as information about an eater who is scheduled to take or has taken food displayed on the photographing screen. Alternatively, at least one of "afternoon snacks" and "morning snacks" may be displayed on the input button 501 as information about a menu of food which is displayed on the photographing screen and is scheduled to be taken or has been taken.

As shown in FIG. 11, in step 520, the food-information input apparatus 100 may receive food information according to the location (e.g. eater "Ranubi") where the activated input button 501 is deactivated on the input guide 502, in the state where the user activates the input button 501 in an initial location (e.g. eater "Danubi") through step 510. For instance, after the activated input button 501 is dragged and moved to the location of the eater "Ranubi", in the state where the user activates the input button 501 in the initial location, i.e. the eater "Danubi" through step 520, the input button 501 may be deactivated in the location of the eater "Ranubi". Then, the food-information input apparatus 100 may check the location of the input button 501 on the input guide 502 which is deactivated by the user to correspond to the food eater, "Ranubi", and receive information about the food eater as "Ranubi", according to the checked location. Meanwhile, when the food-information input apparatus 100 displays the food menu before or after a meal, the food menu before or after the meal may have a different color so that the user may recognize the food menu before or after the meal.

Figure 12:
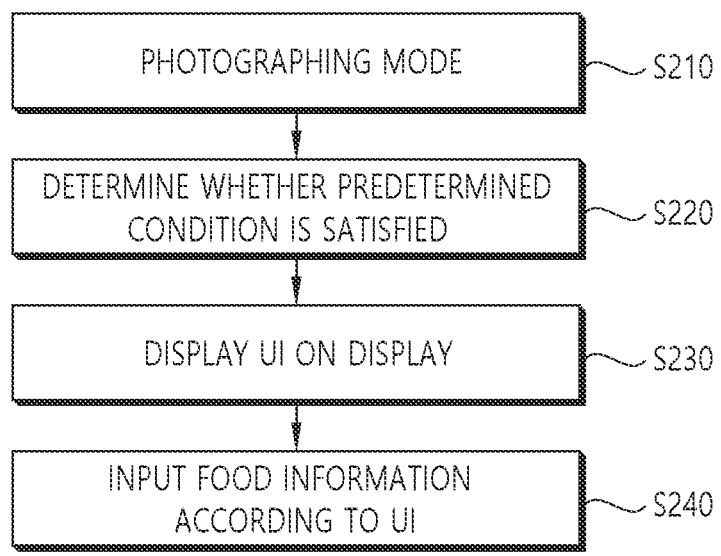
FIG. 12 is a flowchart illustrating a food-information inputting method according to another embodiment of the present disclosure.

Hereinafter, a process of inputting food information according to another embodiment of the present disclosure will be described in detail with reference to FIGS. 12 to 17. FIG. 12 is a flowchart illustrating a food-information inputting method according to another embodiment of the present disclosure, and FIGS. 13 to 17 are diagrams illustrating a food-information inputting process of FIG. 12.

Figure 13:
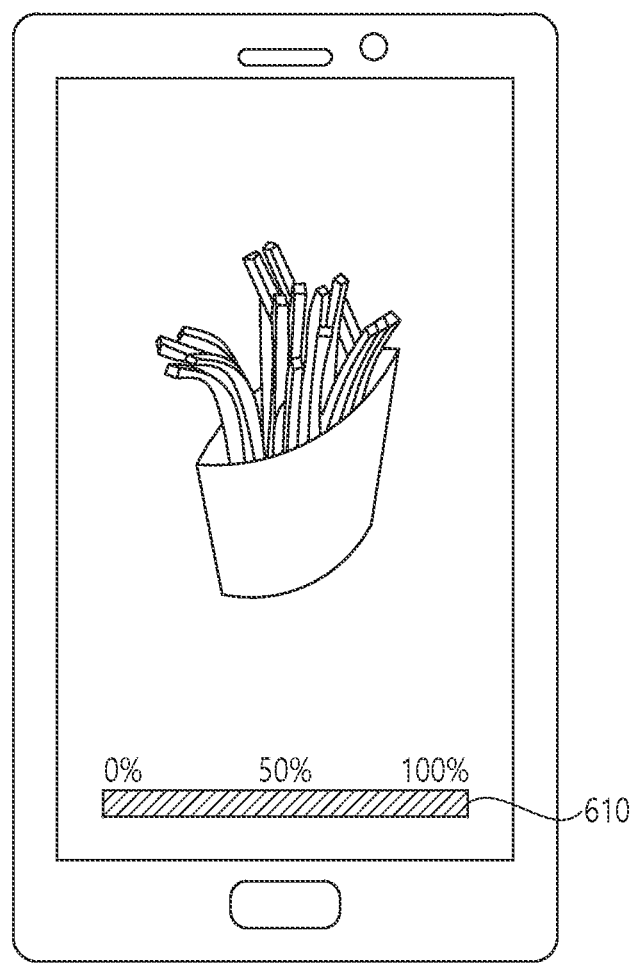
FIGS. 13 to 18 are diagrams illustrating a food-information inputting process of FIG. 12.
Figure 14:

Referring to FIGS. 12 to 14, the food-information inputting method according to another embodiment of the present disclosure may be performed by at least one processor of the food-information input apparatus 100 or a computer which is the food-information input apparatus 100.

First, the food-information input apparatus 100 may be operated in the photographing mode (S210).

The food-information input apparatus 100 may be operated in the photographing mode according to the operation of the food-information input application (not shown), and the camera 120 may be activated.

Subsequently, the food-information input apparatus 100 may determine whether a preset condition is satisfied (S220). For instance, the preset condition may include a condition where photographing is precisely performed on the display 130 through the camera 120 or a condition where food is more precisely recognized.

Subsequently, the food-information input apparatus 100 may display an UI on the display 130 when the preset condition is satisfied (S230).

When the food-information input apparatus 100 does not perform automatic photographing, the food-information input apparatus 100 photographs food by a user's photographing input. The food-information inputting method according to another embodiment of the present disclosure allows the user to input photographing into the food-information input apparatus 100 and simultaneously input food information including the amount of food into the food-information input apparatus 100.

To this end, the UI displayed on the display 130 may be the UI which may input the food information including the food amount. This may be a bar-shaped UI 610 as shown in FIG. 13, but is not limited thereto.

For the photographing of the food-information input apparatus 100, the user should touch the display 130, for example. At this time, the food information including the amount of food which is scheduled to be taken by the user may be input through the touched location according to the UI displayed on the display 130. That is, when the user touches the display 130 once, the photographing may be input and simultaneously the food information including the amount of food which is scheduled to be taken may be input. Thereby, it is unnecessary for the user to separately input the food information including the food amount, thus eliminating a user's inconvenience.

Referring to FIG. 13, the bar-shaped UI 610 displays a food intake ratio displayed on the display 130. However, without being limited thereto, various UIs may be provided according to the type of food recognized by the camera 120.

For instance, the unit (e.g. head, piece, etc.) of food may be displayed on the UI according to the type of the food recognized by the camera 120. When food divided into pieces is recognized by the camera 120, the piece as the unit of the food may be displayed on the UI.

In some embodiments, the photographing input and the input of the food information including the amount of food which is scheduled to be taken may not be simultaneously performed when the user touches the display 130 once. Rather, the UI may be provided to input the food information including the amount of food which is scheduled to be taken, separately from the photographing input.

In some embodiments, referring to FIG. 14, an eater candidate area 710 may be provided to set a food eater as the UI displayed on the display 130.

For instance, the food eater may be selected through the eater candidate area 710, an owner of the food-information input apparatus 100 as well as a preset intake candidate may be displayed on the display 130, and a recent food eater or a frequently set eater may be displayed as the intake candidate on the display 130. Further, the user may set a plurality of food eaters using the UI.

Meanwhile, the UI displayed on the display 130 has an area which may be directly input and set. Thus, when a suitable item is not present on the intake candidate, the user may select a direct input to input the eater.

Figure 15:
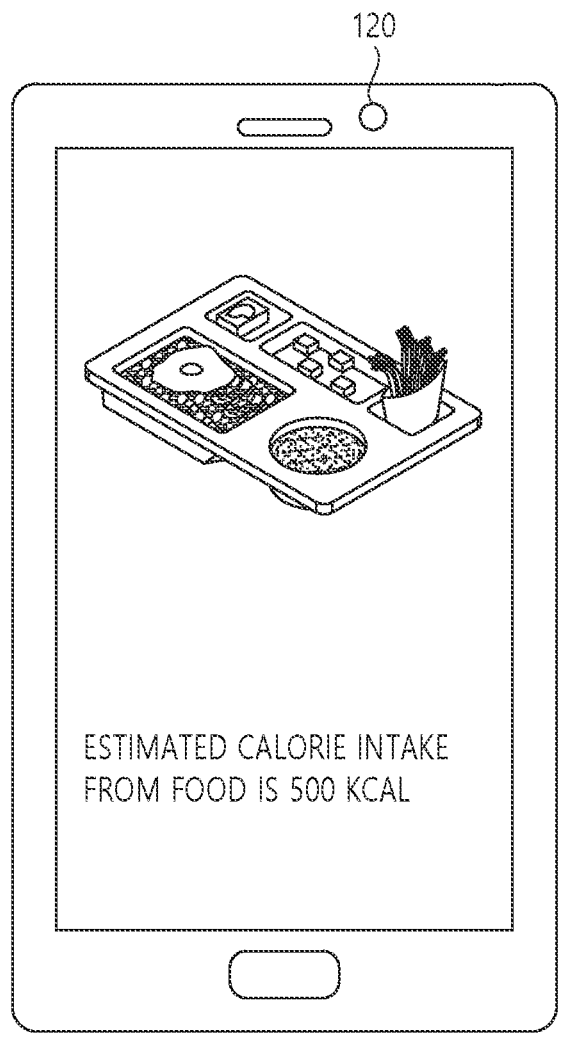

The food-information input apparatus 100 is not limited to a smartphone type shown in FIG. 15, and is not limited as long as it is a mobile apparatus type including the camera 120.

Figure 16:
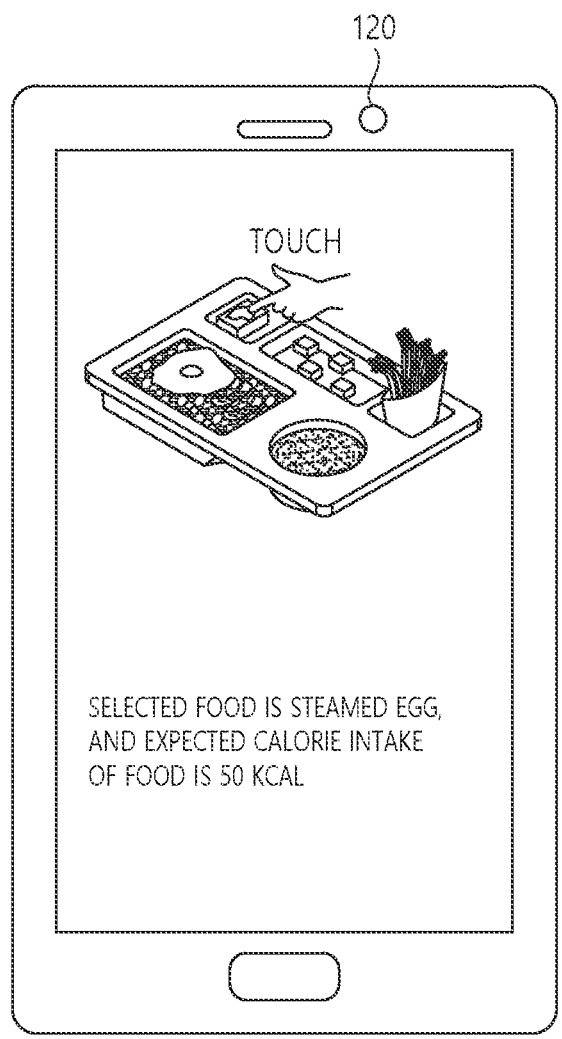

In some embodiments, referring to FIG. 16, the food-information input apparatus 100 may provide to the user food information about food selected by the user among various types of food recognized through the camera 120. For instance, the user may perform selection input on the food-information input apparatus 100 by touching some food images among images displayed on the display 130. However, a method where the user performs the selection input on the food-information input apparatus 100 is not limited thereto.

Furthermore, when the food-information input apparatus 100 is not used for personal use, but an employee uses the food-information input apparatus 100 for many and unspecified persons in a restaurant, etc., intake candidates may be displayed as an intake candidate group. The intake candidate group divided based on at least one feature may be displayed on the display 130. For instance, as a combination of age and gender, the intake candidate group may be displayed such as, but not limited to, a woman in her teens, a man in his teens, a woman in her 20s, or a man in his 20s In some embodiments, if the food is recognized through the camera 120, the UI may be displayed on the display 130, and simultaneously the food-information input apparatus 100 may provide food information about the recognized food to the user. Alternatively, the food-information input apparatus 100 may provide the food information about the recognized food to the user, regardless of the UI displayed on the display 130.

To be more specific, if the food is recognized through the camera 120 even before the user inputs the photographing, the food-information input apparatus 100 may provide the food information about the recognized food to the user. In other words, when the food is recognized through the camera 120, the food-information input apparatus 100 may provide the food information about the food analyzed in real time to the user. The food information may include, for example, food-calorie information, food-type information, food-nutrient information, etc. The type of food information is not limited as long as it is information that may be derived based on the image of recognized food. The food information may be analyzed by the food-information input apparatus 100 or the external server 200 based on the image of the recognized food.

The food-information input apparatus 100 may provide food information derived based on the image of the food recognized by the user through a visual, auditory, or tactile method. For instance, referring to FIG. 12, the image of the food recognized through the camera 120 and the corresponding food-calorie information may be displayed on the display 130. Furthermore, the food-information input apparatus 100 may provide food-nutrient information such as "Current food is a high-protein diet and contains a lot of vitamins, so it is good for fatigue recovery" through a speaker (not shown).

However, the food-information input apparatus 100 of the present disclosure is not limited to a smartphone type shown in FIG. 12, and is not limited as long as it is a mobile apparatus type including the camera 120. For instance, referring to FIG. 19, the food-information input apparatus 100 according to an embodiment of the present disclosure may not include the display 130.

Thereafter, the food-information input apparatus 100 may receive the food information according to the UI from the user (S240).

In some embodiments, the user may photograph a corresponding food eater using the food-information input apparatus 100. For instance, after the input of the food information is performed by the food-information input apparatus 100, the user may photograph a corresponding food eater using the food-information input apparatus 100, and the food-information input apparatus 100 may recognize, an eater photographed at the time closest to the time when the food is photographed, as the corresponding food eater, or may recognize an eater included in the image having a background similar to a background of the photographed food as the corresponding food eater.

In some embodiments, the food-information input apparatus 100 may change the unit of the food displayed on any location or the input button according to the type of the recognized food, and may receive information about the amount of recognized food based on the changed unit of food.

In some embodiments, the food-information input apparatus 100 may analyze the food image of the recognized food to determine whether it is before or after a meal. When the food is photographed before the meal, the food image may be recorded as a user's food review before the meal. Alternatively, when the food is photographed after the meal, the food image may be recorded as a user's food review after the meal.

In some embodiments, the food-information input apparatus 100 may display a recognizable food candidate type based on the recognized food type.

In some embodiments, the food-information input apparatus 100 may search for a restaurant which provides recognized food based on the location of the food-information input apparatus, and may correct and display the received food information based on menu information in the searched restaurant.

Figure 17:
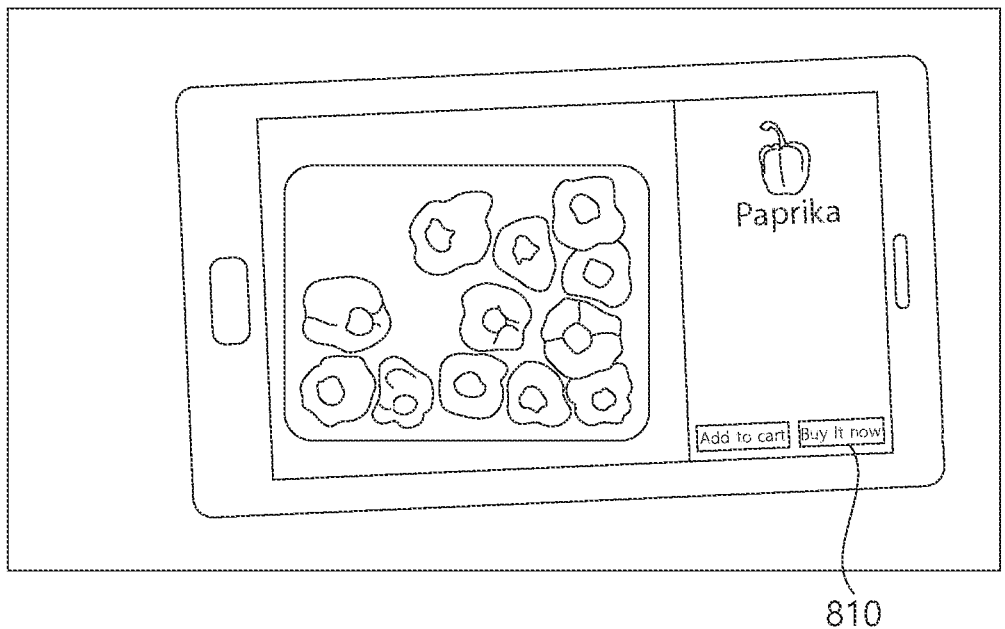

In some embodiments, referring to FIG. 17, the food-information input apparatus 100 may search for the restaurant which provides the recognized food based on the location of the food-information input apparatus, and may order food corresponding to the input food information based on the menu information in the searched restaurant. At this time, when the user touches an order button 810 displayed on the photographing screen for the searched restaurant menu and recognized food, the apparatus may order food to the corresponding restaurant through a payment process or the like.

In some embodiments, in the case of inputting the food information, the food-information input apparatus 100 may provide a preset incentive for the input food information to the user.

In some embodiments, the food-information input apparatus 100 may calculate and display intake-goal information considering the user's characteristics according to the recognized food, may receive intake-schedule information about the recognized food from the user, and may display a ratio of the input intake-schedule information to the displayed intake-goal information.

In some embodiments, after the user takes the recognized food, the food-information input apparatus 100 may display the success or failure of the intake goal based on the input intake-schedule information for the displayed intake-goal information.

Figure 18:
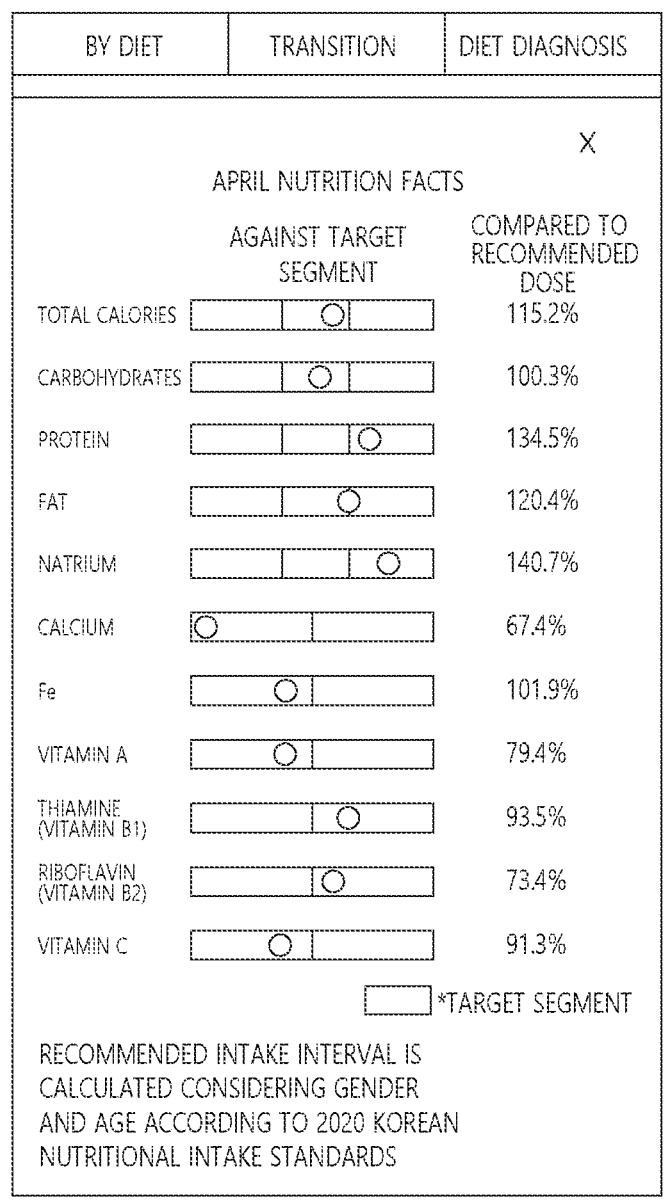

As shown in FIG. 18, the food-information input apparatus 100 may diagnose the user's eating habit to provide the user's nutritional intake status information for each period (e.g. each day, month, year, section, etc.). For example, the nutritional intake status information may include total calories, carbohydrates, protein, fat, sodium, calcium, iron, vitamin A, thiamine, riboflavin, vitamin C, and the like. The user's nutritional intake status information may include first nutritional intake status information compared to a target section, and second nutritional intake status information compared to a recommended dietary allowance. The food-information input apparatus 100 may calculate and display the first nutritional intake status information in which the target section is displayed, and the second nutritional intake status information in which the recommended dietary allowance is displayed, in consideration of the user's nutritional intake status information according to the recognized food.

Although FIGS. 13 to 18 are sequentially described, they are merely for the purpose of illustrating the technical idea of another embodiment of the present disclosure. Since it is apparent to those skilled in the art to which the present disclosure pertains that various changes may be made, for example, the order described in FIGS. 13 to 18 may be changed or one or more steps may be executed in parallel without deviating from the essential characteristics of this embodiment, FIGS. 13 to 18 are not limited to a chronological order.

Figure 19:
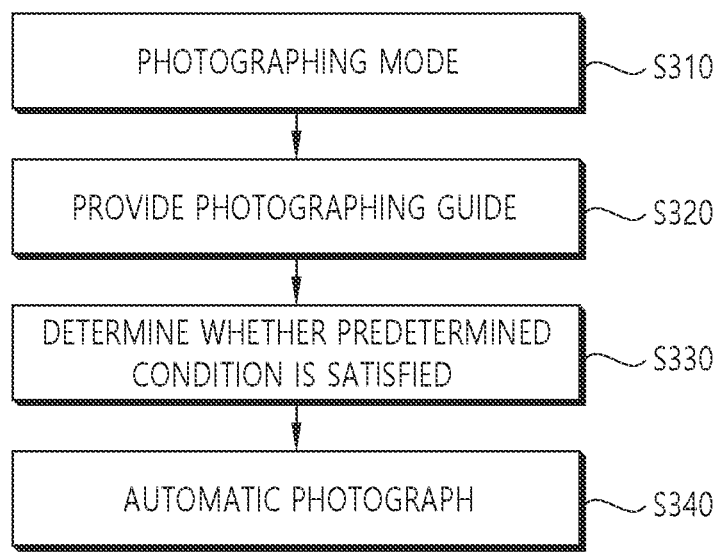
FIG. 19 is a flowchart illustrating a food-information inputting method according to another embodiment of the present disclosure.
Figure 20:
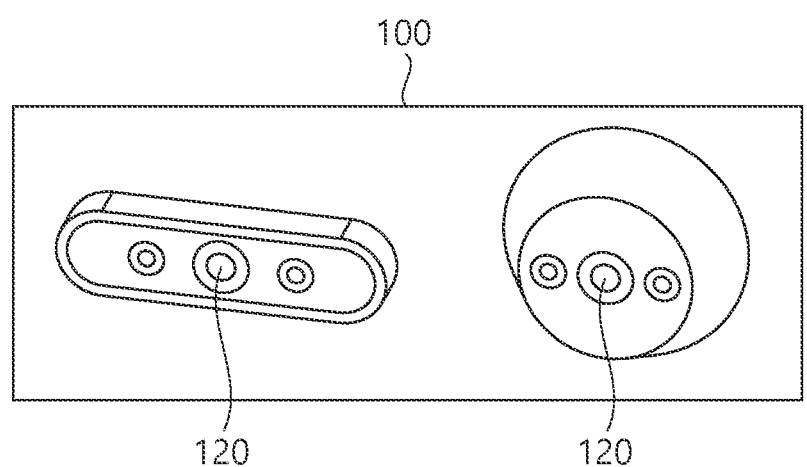
FIG. 20 is a diagram illustrating a food-information input apparatus according to another embodiment of the present disclosure.

Hereinafter, a food-information inputting process according to another embodiment of the present disclosure will be described in detail with reference to FIGS. 19 to 21. FIG. 19 is a flowchart illustrating a food-information inputting method according to another embodiment of the present disclosure. FIG. 20 is a diagram illustrating a food-information input apparatus according to another embodiment of the present disclosure. FIG. 21 is a diagram illustrating a photographing operation according to another embodiment of the present disclosure.

Referring to FIGS. 19 to 21, the food-information inputting method according to another embodiment of the present disclosure may be performed by at least one processor of the food-information input apparatus 100 or a computer which is the food-information input apparatus 100.

First, the food-information input apparatus 100 may be operated in the photographing mode (S310). The food-information input apparatus 100 may be operated in the photographing mode according to the operation of the food-information input application (not shown), and the camera 120 may be activated.

Subsequently, the food-information input apparatus 100 may provide a photographing guide to the user (S320).

In order to precisely analyze the food information including the image, the photographing operation should be performed by the camera 120 at a location which is vertically above a photographing target, i.e. food in the state where the camera 120 is located to be parallel to the food which is the photographing target. When the food is not photographed under the above-described condition, it is not easy to perform high-accuracy analysis even if the acquired food information is analyzed.

To this end, the food-information input apparatus 100 may analyze whether the food and the food-information input apparatus 100 are parallel to each, the food-information input apparatus 100 or the camera 120 is horizontal or not, and the camera 120 is located vertically above the food, thus providing the photographing guide to the user so that the user may displace the food-information input apparatus 100 or the camera 120.

The method of providing the photographing guide to the user may use a visual, auditory, or tactile method. The photographing guide may be visually displayed on the display 130, the photographing guide may be output through a speaker (not shown), or the photographing guide may be provided through a vibration module (not shown), but the present disclosure is not limited thereto.

Subsequently, the food-information input apparatus 100 may determine whether a preset condition is satisfied (S330).

In some embodiments, when the food-information input apparatus 100 is operated in the photographing mode to activate the camera 120, the food-information input apparatus 100 may determine whether to the preset condition is satisfied. The preset condition may be at least one among a condition where the photographing operation is precisely performed in the photographing mode, or a condition where the food-information input apparatus 100 provides food information to the user, or a condition where the food is recognized through the camera 120.

To be more specific, if the food is recognized through the camera 120 even before the user inputs the photographing, the food-information input apparatus 100 may provide the food information about the recognized food to the user. In other words, when the food is recognized through the camera 120, the food-information input apparatus 100 may provide the food information about the food analyzed in real time to the user. The food information may include, for example, food-calorie information, food-type information, food-nutrient information, etc. The type of food information is not limited as long as it is information that may be derived based on the image of recognized food. The food information may be analyzed by the food-information input apparatus 100 or the external server 200 based on the image of the recognized food.

The food-information input apparatus 100 may provide the photographing guide or the food information derived based on the image of the food recognized by the user through a visual, auditory, or tactile method. For instance, the image of the food recognized through the camera 120 and the corresponding food-calorie information may be displayed on the display 130. Furthermore, the food-information input apparatus 100 may provide food-nutrient information such as "Current food is a high-protein diet and contains a lot of vitamins, so it is good for fatigue recovery" through the speaker (not shown).

However, the food-information input apparatus 100 according to another embodiment of the present disclosure is not limited to a smartphone type shown in FIG. 15, and is not limited as long as it is a mobile apparatus type including the camera 120. For instance, referring to FIG. 20, the food-information input apparatus 100 according to another embodiment of the present disclosure may not include the display 130.

When the preset condition is satisfied, the food-information input apparatus 100 may perform the automatic photographing (S340). In other words, when the preset condition is satisfied, the food-information input apparatus 100 may perform the automatic photographing even if there is no user's photographing input.

The preset condition may be an optimum condition which may photograph food using the camera 120. For instance, the preset condition may be a condition where the food-information input apparatus 100 or the camera 120 is horizontal, a condition where the movement of the food-information input apparatus 100 or the camera 120 is equal to or less than a predetermined level, or a condition where the food is recognized from the image photographed through the camera 120. Alternatively, the preset condition may be at least one condition among a condition where the recognized food and the food-information input apparatus 100 are parallel to each other, a condition where the food-information input apparatus 100 is horizontal, a condition where the food-information input apparatus 100 is located vertically above the recognized food, and a condition where the food-information input apparatus 100 is moved.

In other words, referring to FIG. 21, when the food is recognized in the state where the camera 120 is placed to be horizontal and the camera 120 is not shaken, the food-information input apparatus 100 may perform the automatic photographing.

In the food-information inputting process according to another embodiment of the present disclosure, the food-information input apparatus 100 may provide the photographing guide to the user so that the user may find the optimum photographing condition. When the optimum photographing condition is satisfied, the food-information input apparatus 100 performs the automatic photographing, thus increasing a user's convenience.

In some embodiments, the food-information input apparatus 100 may determine whether to the preset condition is satisfied (S330). When the preset condition is satisfied, a notification may be provided so that the automatic photographing is not performed but the user performs the photographing operation. For instance, the food-information input apparatus 100 may provide the notification to the user using at least one method among visual, auditory, and tactile methods. The notification may be displayed on the display 130 to perform photographing, a light emitting apparatus (not shown) included in the food-information input apparatus 100 may emit to provide the notification so that the user performs photographing, or the notification may be provided through the speaker (not shown) or the vibration module (not shown) so that the user performs photographing, but the present disclosure is not limited thereto.

In some embodiments, the user may photograph a corresponding food eater using the food-information input apparatus 100. For instance, after the automatic photographing is performed by the food-information input apparatus 100, the user may photograph a corresponding food eater using the food-information input apparatus 100, and the food-information input apparatus 100 may recognize, an eater photographed at the time closest to the time when the food is photographed, as the corresponding food eater, or may recognize an eater included in the image having a background similar to a background of the photographed food as the corresponding food eater.

In some embodiments, the food-information input apparatus 100 may request the user to input the amount of intake food or a review for the intake food after photographing is performed, and may adjust a reward provided to the user in consideration of the time input by the user according to the corresponding request.

In some embodiments, when the automatic photographing is performed or the photographing is performed by the user's photographing input, the food-information input apparatus 100 may provide the food information about the food recognized by photographing to the user. In other words, when the food is photographed through the camera 120, the food-information input apparatus 100 may provide the food information about the food analyzed in real time to the user. The food information may include, for example, food-calorie information, food-type information, food-nutrient information, etc. The type of food information is not limited as long as it is information that may be derived based on the image of recognized food. The food information may be analyzed by the food-information input apparatus 100 or the external server 200 based on the image of the recognized food.

Meanwhile, a process of inputting food information according to another embodiment of the present disclosure will be described in detail.

In the food-information inputting process according to another embodiment of the present disclosure, the food-information input apparatus 100 may provide various functions to the user after photographing is performed by the food-information input apparatus 100.

A method of inputting various functions from the food-information input apparatus 100 to the user may vary, and is as follows.

First, a selectable area may be provided as the UI on the display 130, and the user's input may be differently recognized according to a location where the user performs touch input (or click input) in the corresponding selectable area.

Furthermore, as the user performs drag input on the display 130 for the photographed image, the food-information input apparatus 100 may perform a predetermined function.

Furthermore, as double touch input (or double click input) is performed, two or more buttons are pressed simultaneously, or touch input (or click input) is performed for two or more areas, the food-information input apparatus 100 may perform a predetermined function.

Finally, as the user directly sets a mode for executing a corresponding function, the food-information input apparatus 100 may perform a given function.

Meanwhile, a function provided by the food-information input apparatus 100 to the user after the photographing is performed by the food-information input apparatus 100 is as follows.

First, when the photographing is performed by the food-information input apparatus 100, this allows the user to set a storage space for a photographed image.

For instance, when the photographing is performed by the food-information input apparatus 100, the photographed image may be analyzed, and then a folder suitable for storage may be recommended among existing folders and the user may store the photographed image in the folder by dragging.

In addition, the user may freely create a folder for a place to come back in the future, food to cook at home, or the best expectation, etc. and may drag the photographed image to the folder to save it.

Furthermore, when the photographing is performed by the food-information input apparatus 100, the user may easily share the photographed image.

For instance, when the user drags the photographed image in a specific direction or performs an input for sharing, the image may be shared with other users through SNS, etc. Furthermore, if the food-information input apparatus 100 is set to the sharing mode through mode setting, when food is included in the photographed image, the image may be automatically shared with other users through SNS, etc. even if there is no additional input.

Thereby, when the user uploads a photographed image to an unspecified community to share the food information, it is possible for people who are thinking about the type of intake food, are looking for the image of photographed food, or are looking for entertainment, to utilize the image.

Subsequently, the review before or after the meal may be input from the user to the food-information input apparatus 100.

The food-information input apparatus 100 may analyze the photographed image to determine whether it is an image for food before or after the meal. In the case of the image photographing the food before the meal, the user's review after photographing may be recorded as a review before intake. In the case of the image photographing the food after the meal, the user's review after photographing may be recorded as a review after intake.

For instance, in the case of the image photographing the food before the meal, the food-information input apparatus 100 causes the user to record the review before intake. For example, according to the drag input direction performed by the user on the display 130, the review before intake, such as a maximum expected value before intake, or a minimum expected value before intake, may be recorded. However, the method of inputting the review before intake is not limited thereto.

Furthermore, in the case of the image photographing the food after the meal, the food-information input apparatus 100 causes the user to record the review after intake. For example, according to the drag input direction performed by the user on the display 130, the review after intake, such as maximum satisfaction after intake, or minimum satisfaction after intake, may be recorded. However, the method of inputting the review after intake is not limited thereto.

The food-information inputting method according to an embodiment of the present disclosure described above may be implemented as a program (or application) to be executed in combination with a hardware apparatus and stored in a medium.

The above-described program may include a code encoded in the computer language such as C, C++, JAVA, or machine language that the processor (CPU) of the computer may read through the apparatus interface of the computer in order for the computer to read the program and execute the methods implemented as the program. The code may include a functional code related to a function defining functions necessary to execute the methods, and may include a control code related to an execution procedure necessary for the processor of the computer to execute the functions according to a predetermined procedure. Furthermore, the code may further include additional information necessary for the processor of the computer to execute the functions or a memory reference related code for which location (address) in the internal or external memory of the computer should be referenced by the media. Furthermore, when the processor of the computer needs to communicate with any other computer or server in a remote location to execute the functions, the code may further include communication-related codes for how to communicate with any other remote computer or server using the communication module of the computer, and which information or media should be transmitted and received during communication.

The storage medium does not mean a medium that stores data for a short moment, such as a register, cache, memory, etc., but a medium that semi-permanently stores data and may be read by a apparatus. Specifically, examples of the storage medium include, but are not limited to, ROM, RAM, CD-ROM, magnetic tape, floppy disk, and optical data storage apparatus. In other words, the program may be stored in various recording media on various servers that the computer may access, or in various recording media on the computer of the user. Furthermore, the medium may be distributed in computer systems connected by a network, and computer-readable codes may be stored in a distributed manner.

Steps of a method or algorithm described in relation to an embodiment of the present disclosure may be implemented directly in hardware, implemented as a software module executed by hardware, or implemented by a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or any type of computer-readable recording medium well known in the art to which the present disclosure pertains.

Although the embodiment of the present disclosure has been described with reference to the accompanying drawings, those skilled in the art to which the present disclosure pertains will understand that the present disclosure may be implemented in other specific forms without changing the technical idea or essential characteristics of the present disclosure. Therefore, it should be understood that the above-described embodiments are illustrative in all respects and not restrictive.

The invention claimed is:

1. A food-information inputting method performed by a food-information input apparatus, the method comprising:
operating in a photographing mode where an input guide and an input button moved along the input guide are displayed on a photographing screen; and
receiving at least one piece of food information using the input guide and the input button, while operating in the photographing mode, wherein, in the receiving of at least one piece of food information, the food information is received according to a location where the activated input button is deactivated on the input guide, in the state where a user activates the input button displayed on the photographing screen, while operating in the photographing mode.

2. The food-information inputting method of claim 1, further comprising: displaying at least one piece of food information corresponding to a location where the input button is activated by the user on the input guide.

3. The food-information inputting method of claim 2, wherein, in the displaying of at least one piece of food information on the photographing screen, the food information corresponding to the location where the input button is activated by the user on the input guide is displayed on the photographing screen in a preset size or more.

4. The food-information inputting method of claim 1, wherein, in the receiving of at least one piece of food information, at least one piece of food information is selectively received according to a moving direction in which the activated input button is moved to be deactivated on the input guide, in the state where the user activates the input button displayed on the photographing screen.

5. The food-information inputting method of claim 1, wherein, in the receiving of at least one piece of food information, at least one piece of food information is selectively received according to a moving distance and a moving direction in which the activated input button is moved to be deactivated on the input guide, in the state where the user activates the input button displayed on the photographing screen.

6. The food-information inputting method of claim 1, wherein the at least one piece of food information comprises at least one piece of information selected from among food amount information, food type information, food calorie information, food nutrient information, food menu information, eater information, intake goal information, intake schedule information, intake time information, intake satisfaction information, food time information suitable for a preset input purpose, food location information suitable for the preset input purpose, food handler information, food-waste disposal information, pre-meal input information, post-meal input information, bookmark information, and information about items stored in a wish list.

7. The food-information inputting method of claim 1, further comprising: displaying at least one selected from among user allergy effect, skin nutrition, growth nutrition, disease effect, aging effect, diet effect, expected intake calories compared to target calories, salinity, converted value of food, food-cost information, food-environment information, carbon value information, resource value information, carbon emission, operating-cost loss cost, food-ingredient information, a pre-meal input button, a post-meal input button, a bookmark input button, and a wish-list storage button, which are related to the at least one piece of input food information.

8. The food-information inputting method of claim 1, further comprising: recognizing food displayed on the photographing screen, wherein at least one piece of input food information is related to the recognized food.

9. The food-information inputting method of claim 8, wherein, in the receiving of at least one piece of food information, a unit of the food displayed on the input button is changed according to a type of the recognized food, and information about an amount of recognized food is input based on the changed unit of food.

10. The food-information inputting method of claim 8, further comprising: displaying an input limit range for the recognized food.

11. The food-information inputting method of claim 10, further comprising: adjusting a minimum value and a maximum value of the displayed input limit range, wherein the input unit of the food information is varied according to the minimum value and the maximum value of the adjusted input limit range.

12. The food-information inputting method of claim 8, further comprising: calculating and displaying intake-goal information considering the user's characteristics according to the recognized food;
receiving intake-schedule information about the recognized food from the user; and
displaying a ratio of the input intake-schedule information to the displayed intake-goal information.

13. The food-information inputting method of claim 12, further comprising: displaying success or failure of the intake goal based on the input intake-schedule information for the displayed intake-goal information, after the user takes the recognized food.

14. The food-information inputting method of claim 8, further comprising: analyzing a food image of the recognized food to determine whether it is before or after a meal; and
recording the food image as a user's food review before the meal when the food is photographed before the meal, or recording the food image as a user's food review after the meal when the food is photographed after the meal.

15. The food-information inputting method of claim 8, further comprising: displaying a recognizable food candidate type based on a type of the recognized food.

16. The food-information inputting method of claim 8, further comprising: searching for a restaurant which provides the recognized food based on a location of the food-information input apparatus; and
correcting and displaying the received food information based on menu information in the searched restaurant.

17. The food-information inputting method of claim 8, further comprising: searching for a restaurant which provides the recognized food based on a location of the food-information input apparatus; and
ordering food corresponding to the input food information based on menu information in the searched restaurant.

18. The food-information inputting method of claim 8, further comprising: providing a preset incentive for the input food information to the user, when the food information is input.

19. A food-information inputting method performed by a food-information input apparatus, the method comprising:
operating in a photographing mode where an input button is displayed on a photographing screen;
checking whether to satisfy a preset photographing guide condition while operating in the photographing mode; and
performing a photographing operation if the preset photographing guide condition is satisfied,
receiving at least one piece of food information, according to a location where the input button is deactivated on the input guide, in the state where a user activates the input button displayed on the photographing screen, while operating in the photographing mode.

20. The food-information inputting method of claim 19, further comprising: recognizing food displayed on the photographing screen; and receiving food information about the recognized food.

21. The food-information inputting method of claim 20, wherein the preset photographing guide condition is at least one condition selected from among a condition where the recognized food and the food-information input apparatus are parallel to each other, a condition where the food-information input apparatus is horizontal, a condition where the food-information input apparatus is located vertically above the recognized food, and a condition where the food-information input apparatus is moved.

22. The food-information inputting method of claim 20, further comprising: displaying photographing accuracy on the screen based on a relative inclination between the recognized food and the food-information input apparatus.

23. The food-information inputting method of claim 20, further comprising: providing a preset incentive for a photographing operation to the user.

24. The food-information inputting method of claim 20, further comprising: analyzing a photographing image of the recognized food to determine whether it is before or after a meal; and recording the photographed image as a user's food review before the meal when the food is photographed before the meal, or recording the photographed image as a user's food review after the meal when the food is photographed after the meal.

25. The food-information inputting method of claim 20, further comprising: displaying a recognizable food candidate type based on a type of the recognized food.

26. The food-information inputting method of claim 20, further comprising: searching for a restaurant which provides the recognized food based on a location of the food-information input apparatus; and correcting and displaying the received food information based on menu information in the searched restaurant.

27. The food-information inputting method of claim 20, further comprising: searching for a restaurant which provides the recognized food based on a location of the food-information input apparatus; and ordering food corresponding to the input food information based on menu information in the searched restaurant.

28. A food-information input apparatus comprising: a camera;

a display;

a memory configured to store one or more programs; and a processor configured to execute the one or more stored programs, wherein the processor is operated in a photographing mode where an input guide and an input button moved along the input guide are displayed on a photographing screen, through the display; and wherein at least one piece of food information is input using the input guide and the input button through the camera, while the processor is operated in the photographing mode, wherein, the at least one piece of food information, the food information is input according to a location where the input button is deactivated on the input guide, in the state where a user activates the input button displayed on the photographing screen, while operating in the photographing mode.

29. A food-information input apparatus comprising: a camera;

a display;

a memory configured to store one or more programs; and a processor configured to execute the one or more stored programs, wherein the processor is operated in a photographing mode where an input button is displayed on a photographing screen, through the display, wherein it is checked whether to satisfy a preset photographing guide condition, while the processor is operated in the photographing mode, and wherein photographing is performed through the camera if the preset photographing guide condition is satisfied, wherein, at least one piece of food information is received according to a location where the input button is deactivated on the input guide, in the state where a user activates the input button displayed on the photographing screen, while operating in the photographing mode.

* * * * *